US010659642B2

(12) United States Patent
Masaru

(10) Patent No.: US 10,659,642 B2
(45) Date of Patent: May 19, 2020

(54) MEDIUM FEEDING DEVICE AND IMAGE READING APPARATUS

(71) Applicant: SEIKO EPSON CORPORATION, Tokyo (JP)

(72) Inventor: Sekito Masaru, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/276,312

(22) Filed: Feb. 14, 2019

(65) Prior Publication Data

US 2019/0253576 A1    Aug. 15, 2019

(30) Foreign Application Priority Data

Feb. 15, 2018    (JP) ................................. 2018-025184

(51) Int. Cl.
*H04N 1/00*    (2006.01)
*B65H 5/06*    (2006.01)
*B65H 7/14*    (2006.01)

(52) U.S. Cl.
CPC ......... *H04N 1/00726* (2013.01); *B65H 5/062* (2013.01); *B65H 7/14* (2013.01); *H04N 1/00732* (2013.01); *H04N 1/00734* (2013.01); *H04N 1/00777* (2013.01); *H04N 1/00779* (2013.01)

(58) Field of Classification Search
None
See application file for complete search history.

(56) References Cited

U.S. PATENT DOCUMENTS

| 3,837,887 A * | 9/1974 | Akamatsu ............. B05C 11/028 430/270.1 |
| 4,136,979 A * | 1/1979 | Piper ........................ B41J 11/34 400/616.2 |
| 6,367,999 B1 * | 4/2002 | Juan ..................... B41J 11/0085 400/642 |
| 6,421,581 B1 * | 7/2002 | Hamamoto .......... B41J 13/0018 271/152 |
| 9,186,919 B2 * | 11/2015 | Ishizuka .............. B41J 13/0009 |
| 10,389,900 B2 * | 8/2019 | Arimori ............. H04N 1/00713 |
| 2002/0126190 A1 * | 9/2002 | Juan ..................... B41J 11/0085 347/102 |
| 2004/0066526 A1 * | 4/2004 | Inoo ................... G03G 15/5062 358/1.14 |

(Continued)

FOREIGN PATENT DOCUMENTS

JP    57-169767 A    10/1982
JP    58-096210 A    6/1983

(Continued)

*Primary Examiner* — Anh-Vinh T Nguyen
(74) *Attorney, Agent, or Firm* — Workman Nydegger

(57) ABSTRACT

A medium feeding device includes: a placement unit on which a medium is placed; a feeding section that feeds the medium placed on the placement unit; a wrinkle detection section that is provided on a further upstream side than the feeding section in a feeding direction and outputs a detection value in accordance with a wrinkle in the medium; and a control section that performs predetermined control on the basis of the detection value of the wrinkle detection section and stops the feeding section in a case in which the detection value output from the wrinkle detection section exceeds a predetermined allowable value.

10 Claims, 17 Drawing Sheets

(56) References Cited

U.S. PATENT DOCUMENTS

| | | | |
|---|---|---|---|
| 2004/0223022 A1* | 11/2004 | Endo | B41J 11/0065 347/19 |
| 2005/0151773 A1* | 7/2005 | Watarai | B41J 3/4078 347/16 |
| 2005/0280694 A1* | 12/2005 | Tsujino | B41J 2/45 347/238 |
| 2006/0182451 A1* | 8/2006 | Shoji | G03G 15/55 399/9 |
| 2012/0062676 A1* | 3/2012 | Mitsuya | B41J 11/06 347/104 |
| 2013/0235437 A1* | 9/2013 | Koseki | G03G 9/00 358/515 |
| 2014/0029968 A1* | 1/2014 | Tamaki | G03G 15/2064 399/67 |
| 2014/0054839 A1* | 2/2014 | Umi | B65H 7/02 271/10.01 |
| 2014/0054850 A1 | 2/2014 | Umi et al. | |
| 2014/0054853 A1 | 2/2014 | Hongo et al. | |
| 2014/0063163 A1* | 3/2014 | Kanemoto | B65H 23/0216 347/104 |
| 2015/0231902 A1* | 8/2015 | Ishizuka | B41J 13/0009 347/16 |
| 2016/0026135 A1* | 1/2016 | Kato | G03G 15/5029 399/400 |
| 2016/0304304 A1* | 10/2016 | Link | B65H 7/02 |
| 2017/0006191 A1* | 1/2017 | Mori | H04N 1/6008 |
| 2018/0262626 A1* | 9/2018 | Genda | H04N 1/00005 |
| 2019/0002225 A1* | 1/2019 | Kadota | B65H 3/063 |

FOREIGN PATENT DOCUMENTS

| | | |
|---|---|---|
| JP | 2008-213957 A | 9/2008 |
| JP | 5404871 B | 2/2014 |
| JP | 2014-043300 A | 3/2014 |

* cited by examiner

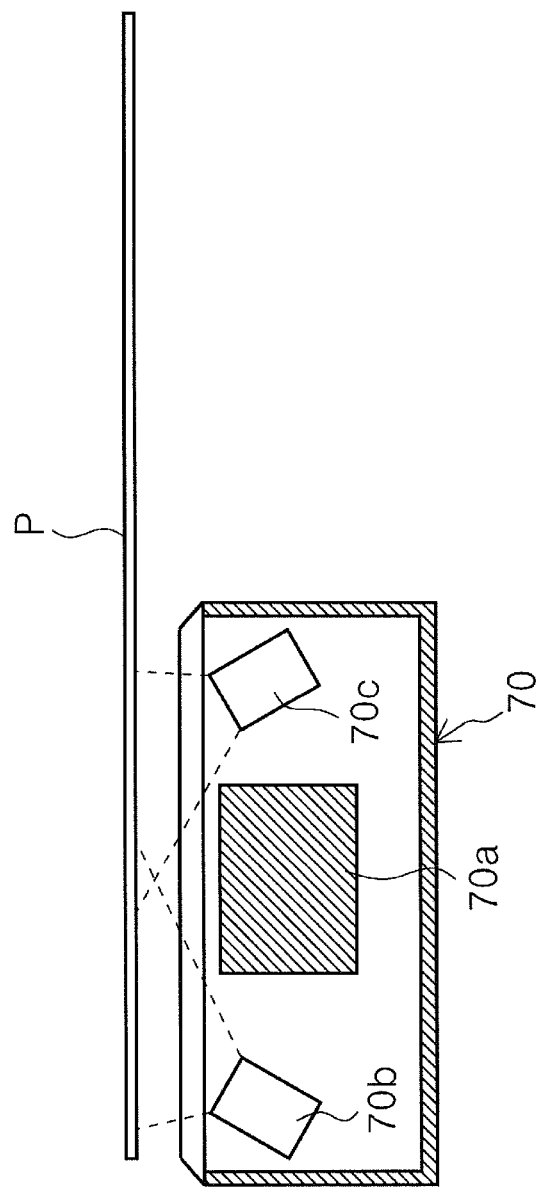

MEDIUM FEEDING DEVICE AND IMAGE READING APPARATUS

BACKGROUND

1. Technical Field

The present invention relates to a medium feeding device that feeds a medium and an image reading apparatus provided with the same.

2. Related Art

Hereinafter, a scanner that is an example of an image reading apparatus will be described. The scanner is provided with an auto document feeder (ADF) that automatically feeds original documents and is configured to be able to perform automatic feeding and reading of a plurality of original document.

Here, jam may occur in an original document transport path in an image reading apparatus, and a variety of jam detection mechanisms have been employed in the related art. As one of the jam detection mechanisms, there is a method of detecting sound generated in the original document transport path through a microphone and determining jam. JP-A-2014-43300 discloses a sound jam determination method in which a first microphone and a second microphone are provided at one and the other end of a direction that orthogonally intersects an original document transport direction, respectively, and it is determined whether or not jam has occurred on the basis of a difference between a first sound signal obtained through the first microphone and a second sound signal obtained through the second microphone, in view of a problem that it may be erroneously determined that jam has occurred in a case in which a wrinkled original document is transported.

According to the jam determination method described in JP-A-2014-43300, components of sound generated by the wrinkle in the original document are removed by extracting the difference between the first sound signal obtained through the first microphone and the second sound signal obtained through the second microphone. Although normal transport of the wrinkled original document and skew jam (jam that occurs due to an original document crushing against a side wall on one side of a transport path) are distinguished in this manner, the first sound signal obtained through the first microphone and the second sound signal obtained through the second microphone may be in the same level in a case in which jam occurs without any skew, and there is a concern that it may not be possible to distinguish the jam from a case in which the wrinkled original document has been transported normally. That is, it is possible to state that the wrinkled document cannot be detected with the configuration described in JP-A-2014-43300.

SUMMARY

An advantage of some aspects of the invention is to realize more appropriate transport control by reliably detecting a wrinkled medium.

According to an aspect of the invention, there is provided a medium feeding device including: a placement unit on which a medium is placed; a feeding section that feeds the medium placed on the placement unit; a wrinkle detection section that is provided on a further upstream side than the feeding section in a feeding direction and outputs a detection value in accordance with a wrinkle in the medium; and a control section that performs predetermined control on the basis of the detection value of the wrinkle detection section.

In this case, since the medium feeding device includes the placement unit on which the medium is placed, the feeding section that feeds the medium placed on the placement unit, and the wrinkle detection section that is provided on the further upstream side than the feeding section in the feeding direction and outputs a detection value in accordance with a wrinkle in the medium, it is possible to expect to detect the wrinkle in the medium before jam of the medium occurs, to more reliably detect whether or not there is a wrinkle in the medium, and thereby to perform more appropriate transport control.

In the device, the wrinkle detection section may be formed of an optical sensor that includes a light emitting unit that emits light to a surface of the medium placed on the placement unit and a light receiving unit that receives light reflected by the surface of the medium.

In this case, since the wrinkle detection section is formed of the optical sensor that includes the light emitting unit that emits light to the surface of the medium placed on the placement unit and the light receiving unit that receives light reflected by the surface of the medium, it is possible to form the wrinkle detection section with a simple structure at low costs.

In the device, the wrinkle detection section may be formed of a contact-type sensor that includes a contact that is brought into contact with a surface of the medium placed on the placement unit and a detection unit that detects motion of the contact.

In this case, since the wrinkle detection section is formed of the contact-type sensor that includes the contact that is brought into contact with the surface of the medium placed on the placement unit and the detection unit that detects motion of the contact, it is possible to form the wrinkle detection section with a simple structure at low costs.

In the device, the wrinkle detection section may be formed of a contact-type sensor that includes a rotating member that is brought into contact with a surface of the medium placed on the placement unit and a detection unit that detects motion of the rotating member.

In this case, since the wrinkle detection section is formed of the contact-type sensor that includes the rotating member that rotates in contact with the surface of the medium placed on the placement unit and the detection unit that detects motion of the rotating member, it is possible to form the wrinkle detection section with a simple structure at low costs.

In the device, the wrinkle detection section may include a contact that is brought into contact with a surface of the medium placed on the placement unit, and the wrinkle detection section may be formed of a second sound detection section that detects sound generated through contact between the medium and the contact.

In this case, since the wrinkle detection section includes the contact that is brought into contact with the surface of the medium placed on the placement unit and the wrinkle detection section is formed of the sound detection section that detects sound generated through contact between the medium and the contact, it is possible to form the wrinkle detection section with a simple section at low costs.

The device may further include a first sound detection section that is provided on a further downstream side than the feeding section in the feeding direction, the control section may determine that jam has occurred in a case in which a sound volume detected by the second sound detection section when the medium is fed exceeds a threshold value stored in the storage unit, and the control section may increase the threshold value in accordance with the detection value output from the wrinkle detection section.

There is a concern that a wrinkled medium generates sound to some extent in a medium transport path even and this is erroneously detected as jam even if no jam has occurred. In this case, since the control section increases the threshold value for determining jam in accordance with the detection value output from the wrinkle detection section, it is possible to more accurately determine jam even in a case in which there is a wrinkle in the medium.

In the device, the control section may stop the feeding section in a case in which the detection value output from the wrinkle detection section exceeds a predetermined allowable value.

A medium with a wrinkle to a significant extent tends to cause jam in the medium transport path. In this case, since the control section stops the feeding section in a case in which the detection value output from the wrinkle detection section exceeds the predetermined allowable value, it is possible to prevent jam from occurring in advance.

According to another aspect of the invention, there is provided an image reading apparatus including: a reading section that reads a medium; a transport section that transports the medium to the reading section; and the medium feeding device that feeds the medium to the transport section.

In this case, effects and advantages similar to those described in the aforementioned aspect can be achieved by the image reading apparatus.

In the apparatus, the control section may suppress at least either a medium feeding speed of the feeding section or a medium transport speed of the transport section in accordance with the detection value output from the wrinkle detection section.

A medium with a wrinkle to a significant extent tends to cause jam in the medium transport path. In the device, since the control section suppresses at least either the medium feeding speed of the feeding section or the medium transport speed of the transport section in accordance with the detection value output from the wrinkle detection section, it is possible to expect suppression of jam.

In the apparatus, the reading section may include a first reading unit and a second reading unit that are arranged to face each other with a medium transport path interposed therebetween, the reading section may be able to adjust the first reading unit and the second reading unit, and the control section may adjust an interval between the first reading unit and the second reading unit in accordance with the detection value output from the wrinkle detection section.

A wrinkled medium causes shadow when the medium is read by the reading section. In this case, since the control section adjusts the interval between the first reading unit and the second reading unit in accordance with the detection value output from the wrinkle detection section, it is possible to expect reduction of a wrinkle and thus to obtain a satisfactory reading result by reducing the interval between the first reading unit and the second reading unit in a case in which the level of the wrinkle is significant, in particular.

BRIEF DESCRIPTION OF THE DRAWINGS

The invention will be described with reference to the accompanying drawings, wherein like numbers reference like elements.

FIG. 17 is a side sectional view illustrating a modification mode of the image reading unit in the respective embodiments.

DESCRIPTION OF EXEMPLARY EMBODIMENTS

Figure 1:
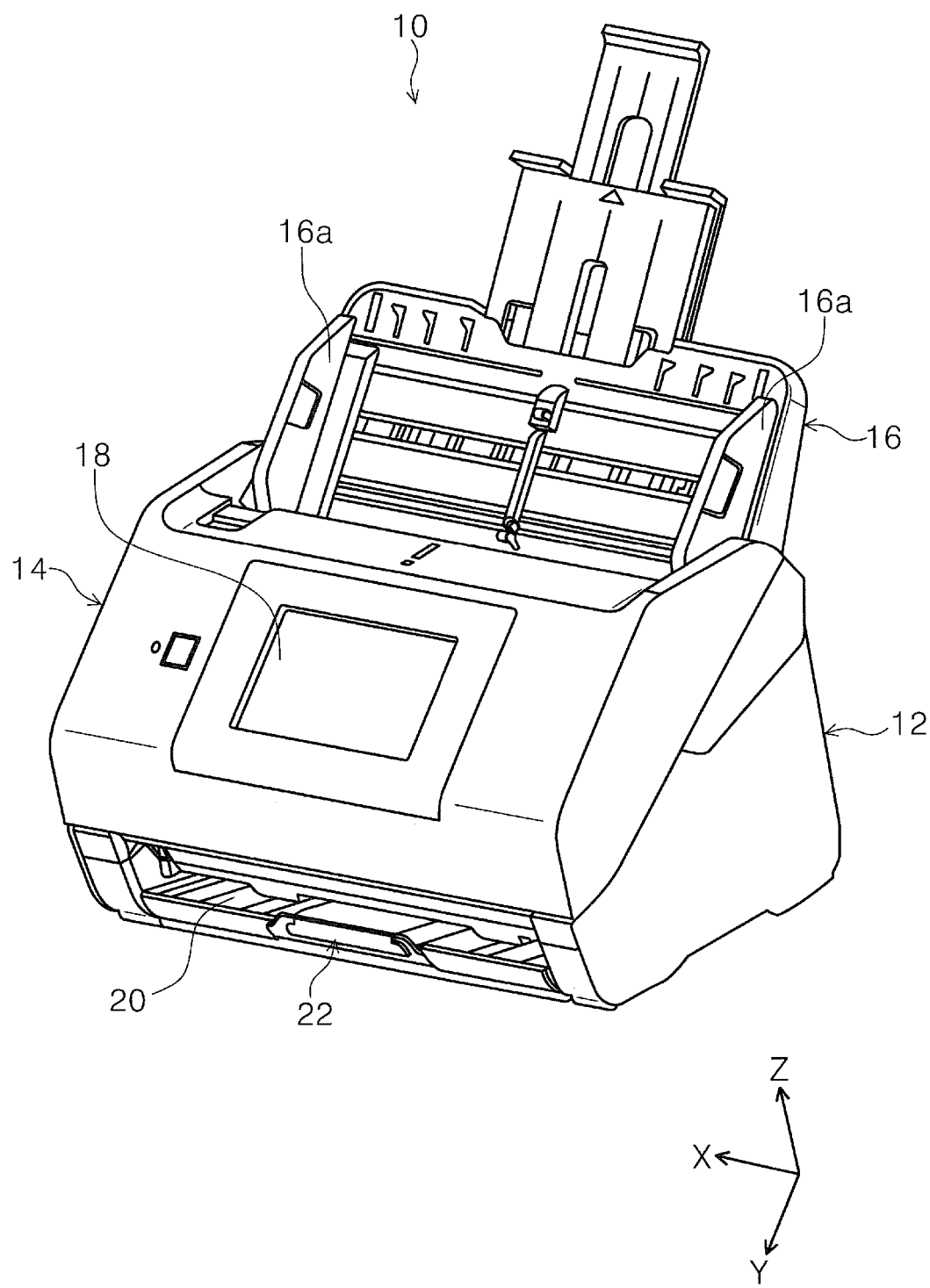
FIG. 1 is a perspective view of an appearance of a scanner according to the invention.

Hereinafter, embodiments of the invention will be described with reference to drawings. Note that the same reference numerals will be given to the same configurations in the respective embodiments, configurations will be described only in the embodiment described first, and description of the configurations will be omitted in the following embodiments.

Figure 2:
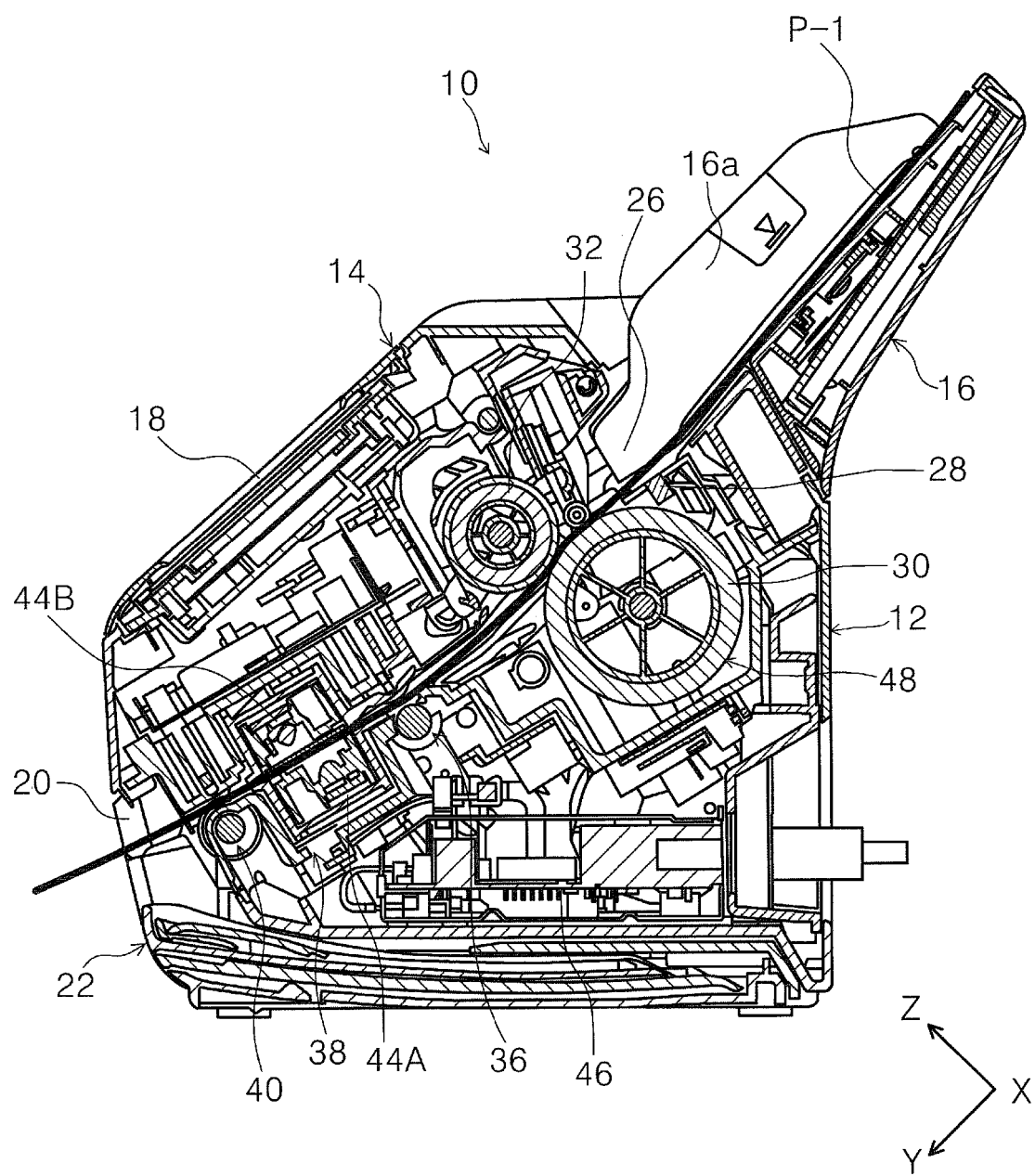
FIG. 2 is a side sectional view illustrating a medium transport path of the scanner according to the invention.
Figure 3:
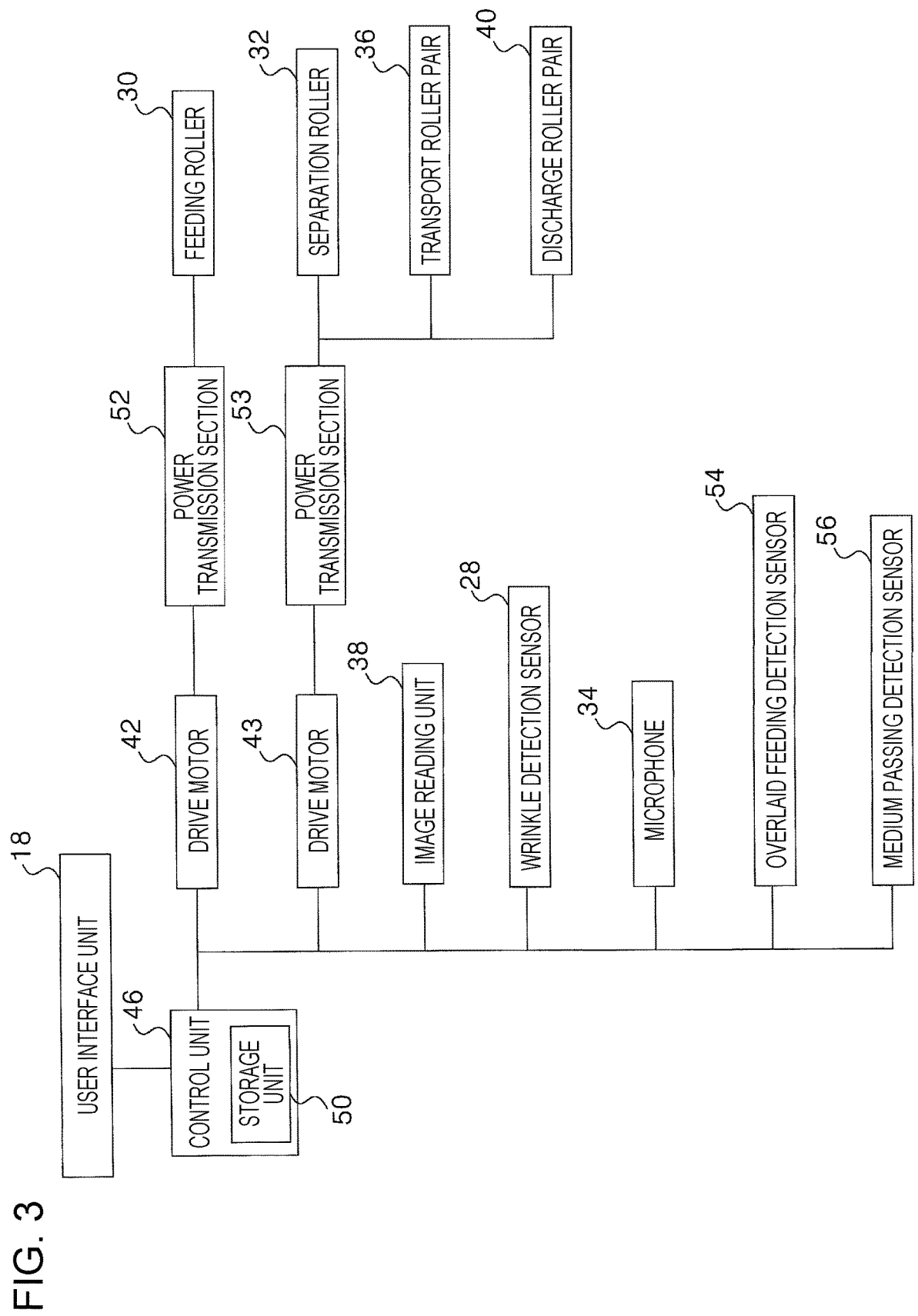
FIG. 3 is a block diagram of the scanner according to the invention.
Figure 4:
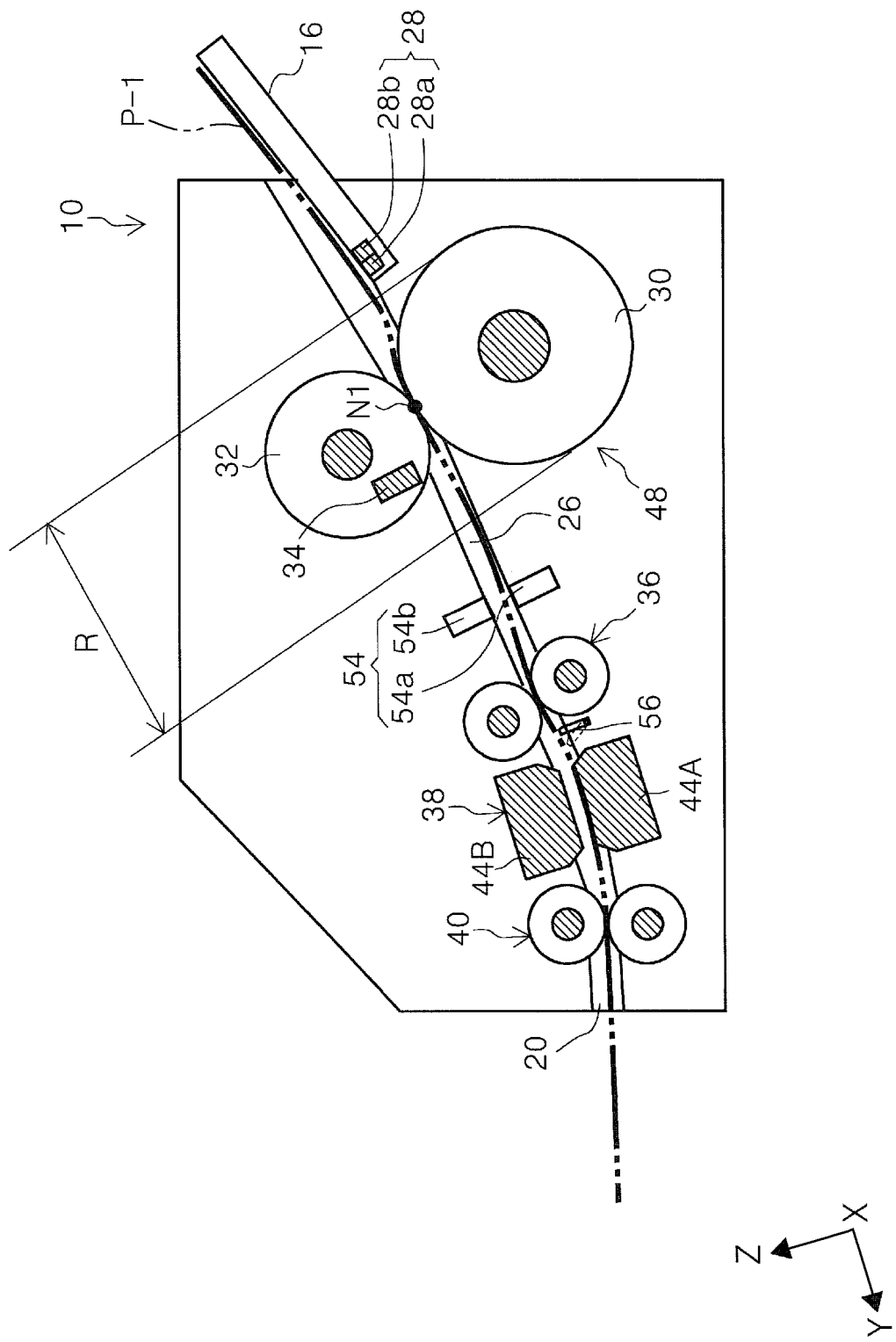
FIG. 4 is a side sectional view illustrating a medium transport path of a scanner according to a first embodiment.
Figure 5:
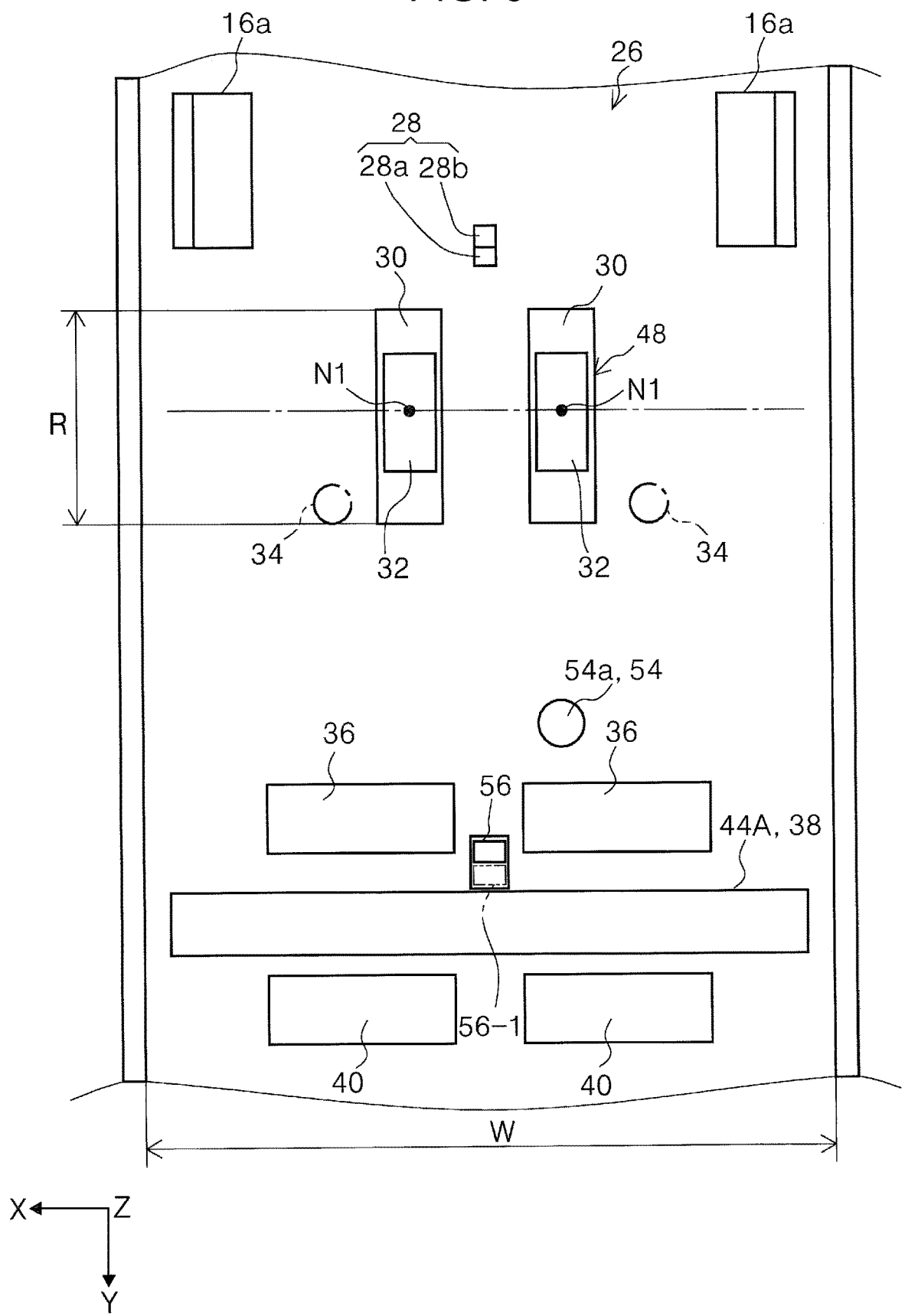
FIG. 5 is a plan view illustrating the medium transport path of the scanner according to the first embodiment.

FIG. 1 is a perspective view of an appearance of a scanner according to the invention, FIG. 2 is a side sectional view illustrating a medium transport path of the scanner according to the invention, FIG. 3 is a block diagram of the scanner according to the invention, FIG. 4 is a side sectional view illustrating a medium transport path according to a first embodiment, and FIG. 5 is a plan view illustrating the medium transport path of the scanner according to the first embodiment.

Figure 6:
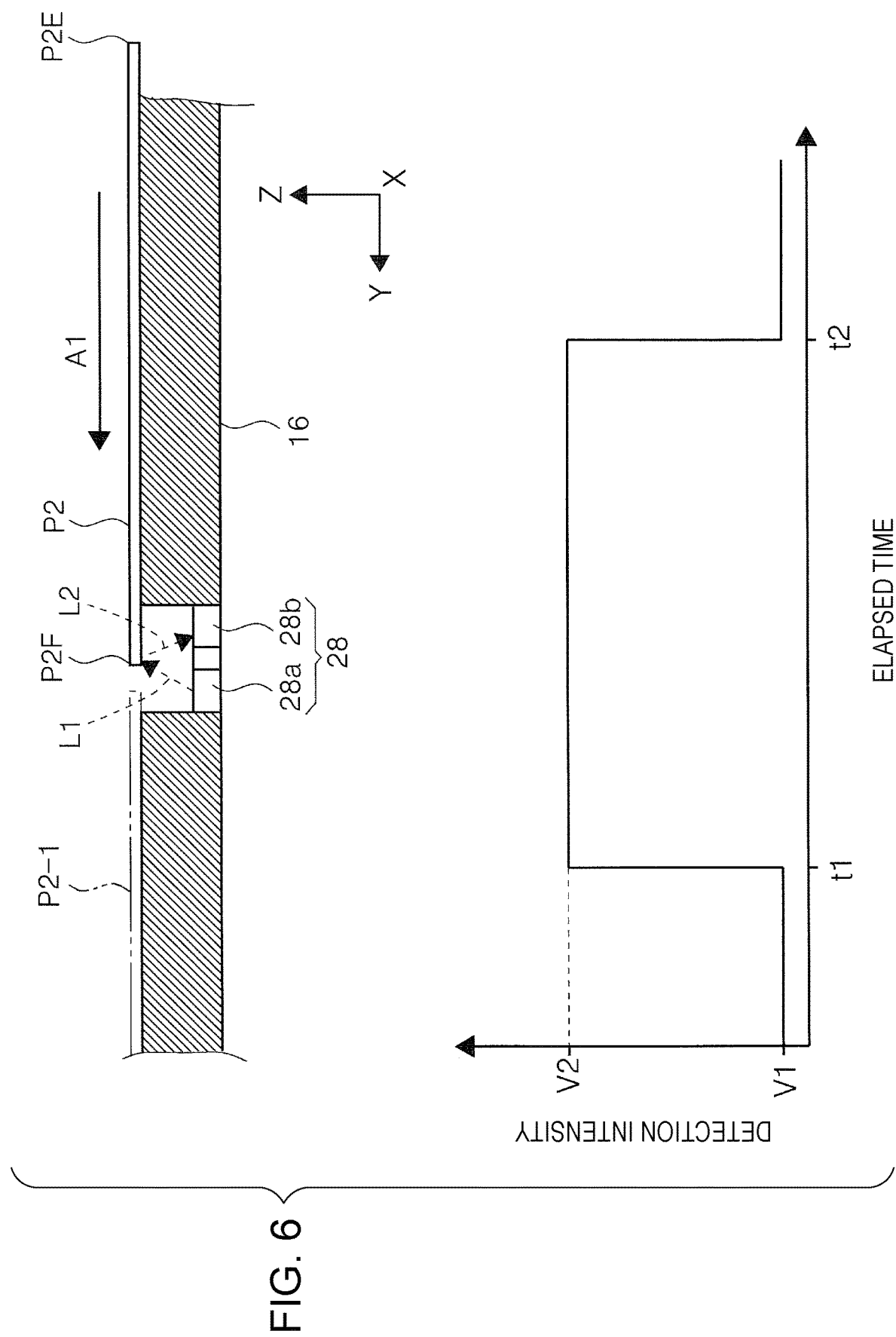
FIG. 6 includes an upper diagram illustrating a state in which a non-wrinkled medium is caused to pass through a wrinkle detection sensor according to the first embodiment, and a lower diagram illustrating a detection state of the wrinkle detection sensor when the non-wrinkled medium is caused to pass.
Figure 7:
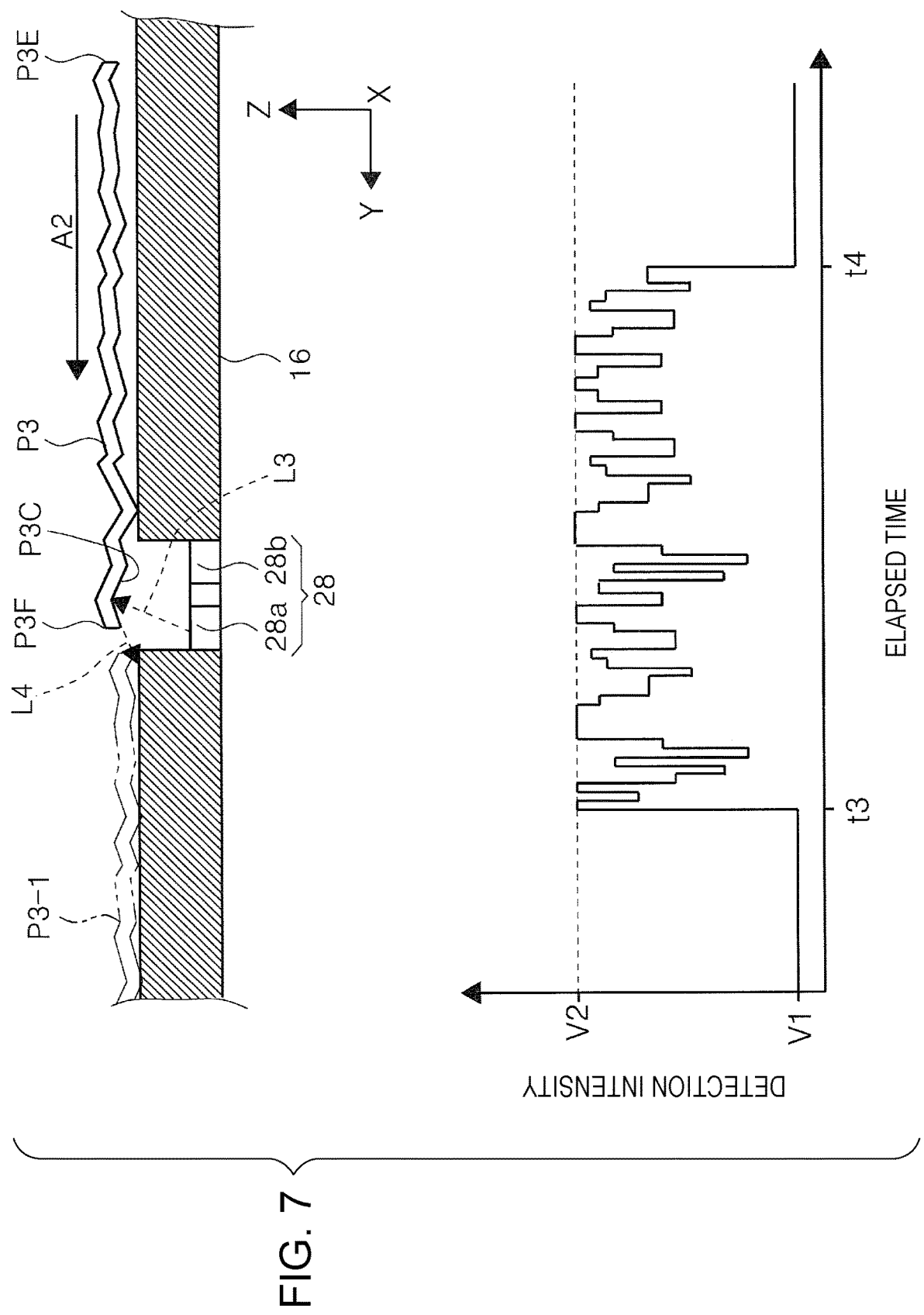
FIG. 7 includes an upper diagram illustrating a state in which a wrinkled medium is caused to pass through the wrinkle detection sensor according to the first embodiment, and a lower diagram illustrating a detection state of the wrinkle detection sensor when the wrinkled medium is caused to pass.
Figure 8:
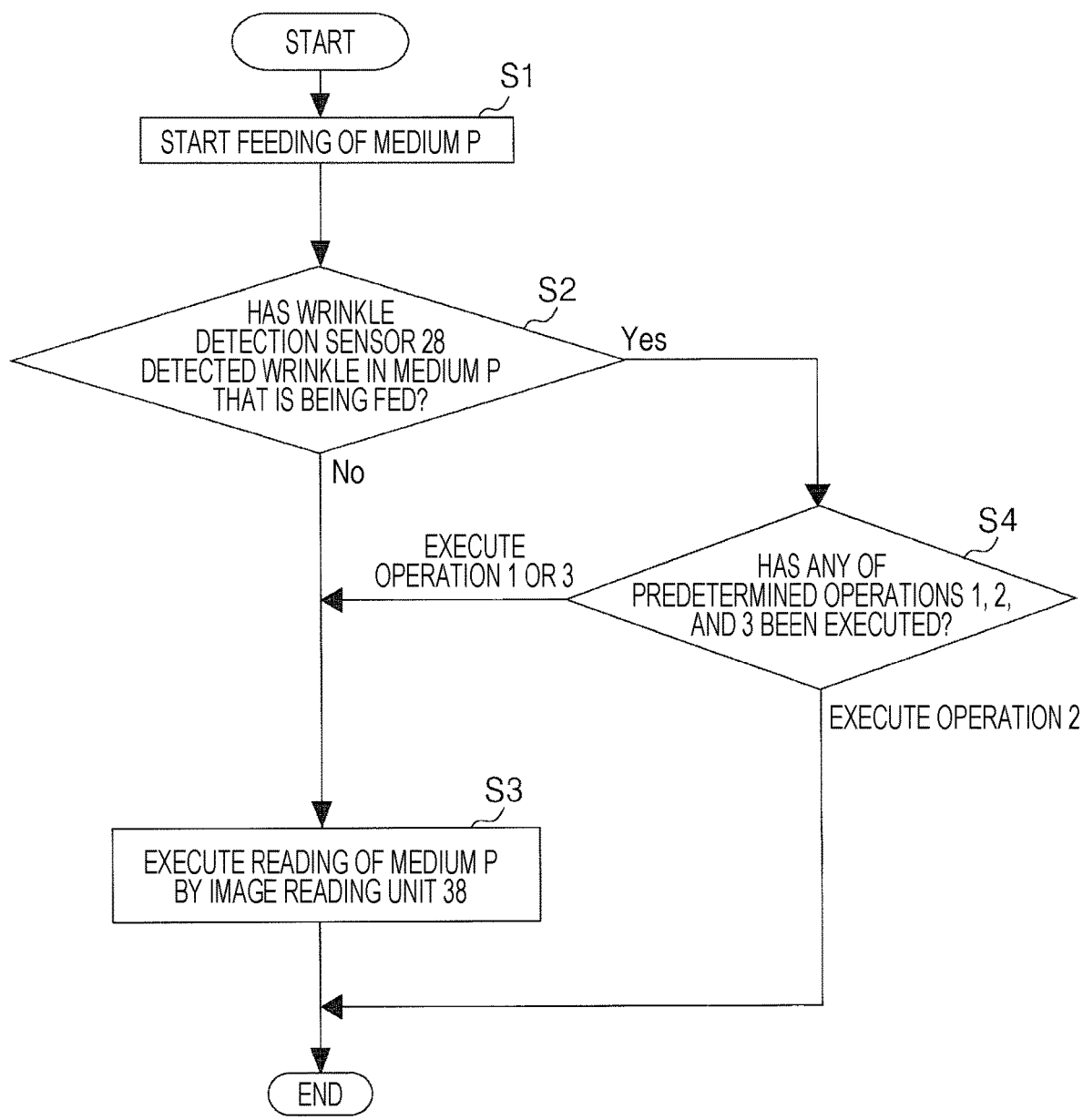
FIG. 8 is a flowchart of wrinkle detection when a medium is fed in the scanner according to the first embodiment.
Figure 9:
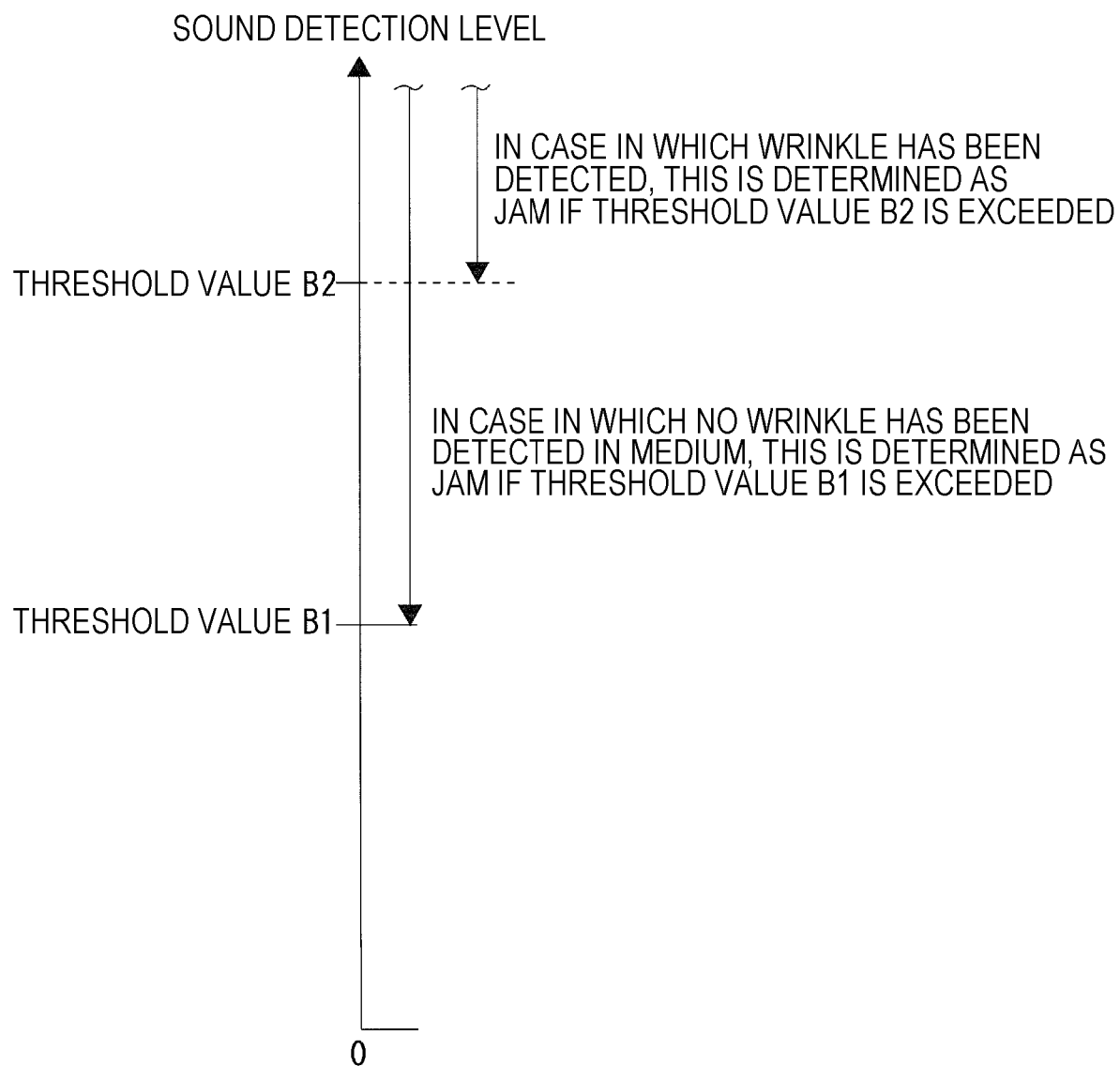
FIG. 9 is a diagram schematically describing a threshold value of a microphone according to the first embodiment.

The upper diagram in FIG. 6 is a diagram illustrating a state in which a non-wrinkled medium is caused to pass through a wrinkle detection sensor according to the first embodiment, and the lower diagram in FIG. 6 is a diagram illustrating a detection state of the wrinkle detection sensor when the non-wrinkled medium is caused to pass. The upper diagram in FIG. 7 is a state in which a wrinkled medium is caused to pass through the wrinkle detection sensor according to the first embodiment, and the lower diagram in FIG. 7 is a diagram illustrating a detection state of the wrinkle detection sensor when the wrinkled medium is caused to pass. FIG. 8 is a flowchart of wrinkle detection when a medium is fed in the scanner according to the first embodiment, and FIG. 9 is a diagram schematically describing a threshold value of a microphone according to the first embodiment.

Figure 10:
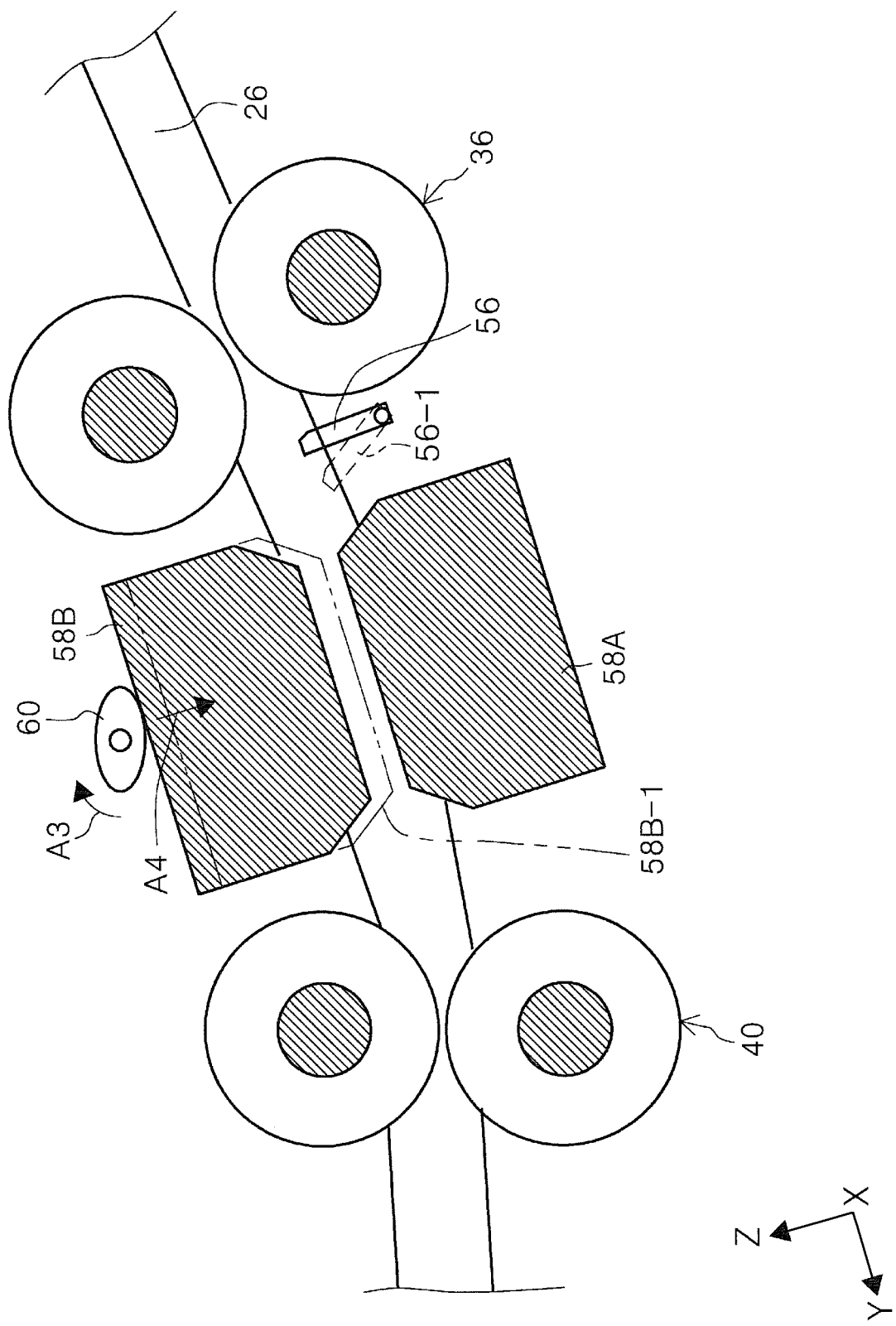
FIG. 10 is a side sectional view for describing interval adjustment between a first reading unit and a second reading unit in an image reading unit in the scanner according to the first embodiment.
Figure 11:
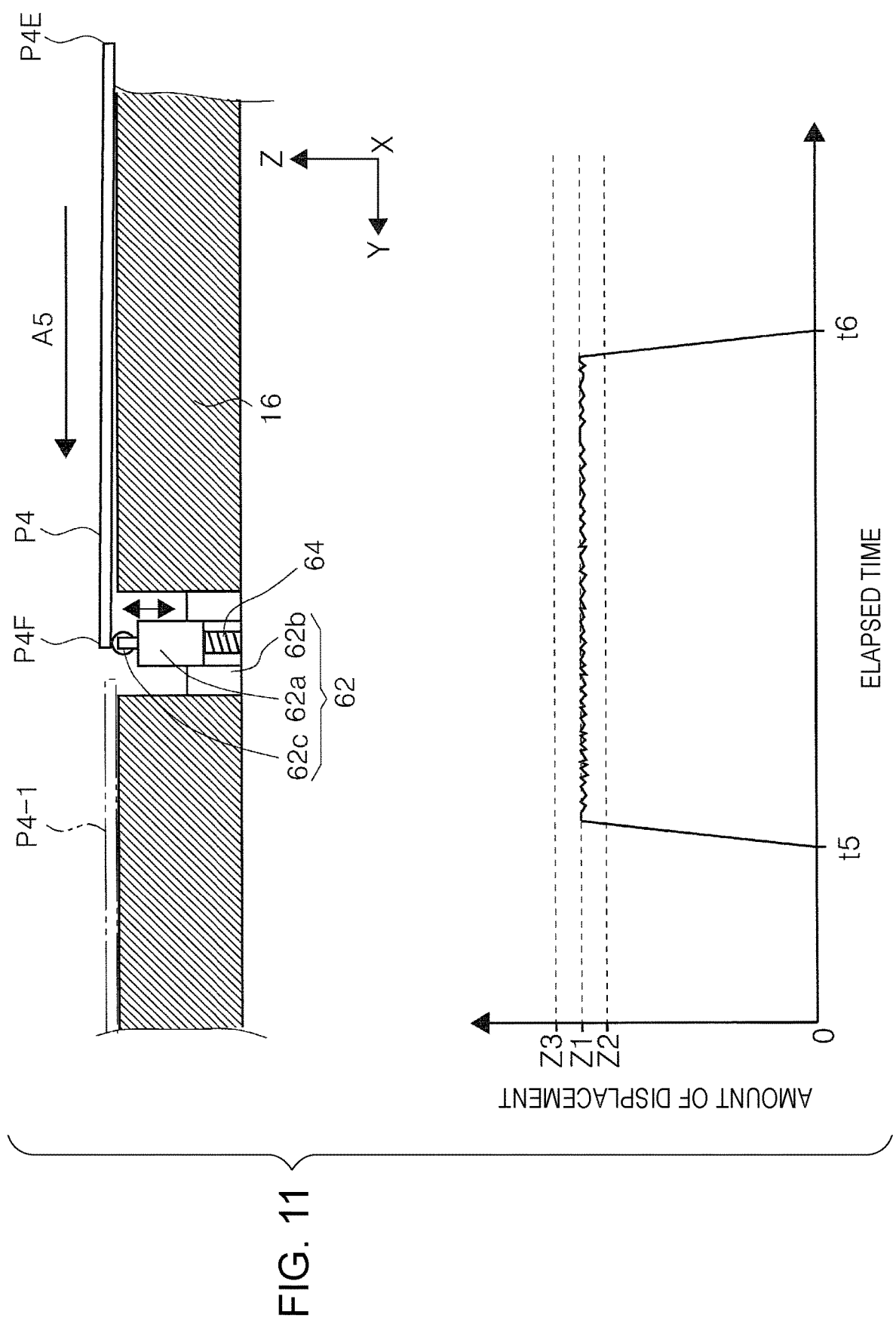
FIG. 11 includes an upper diagram a diagram illustrating a state in which a non-wrinkled medium is caused to pass through a wrinkle detection sensor according to a second embodiment, and a lower diagram illustrating a detection state of the wrinkle detection sensor when the non-wrinkled medium is caused to pass.
Figure 12:
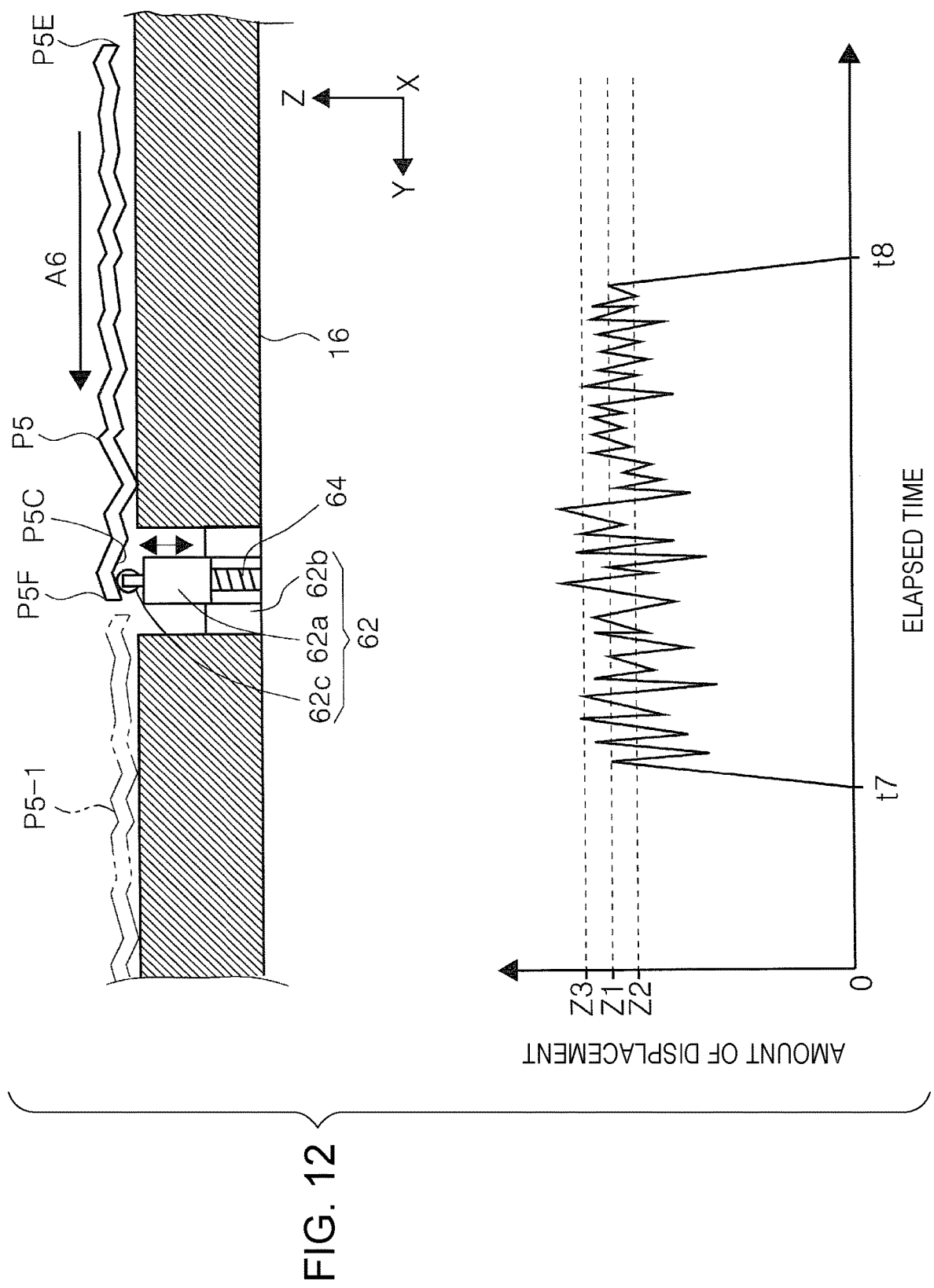
FIG. 12 includes an upper diagram illustrating a state in which a wrinkled medium is caused to pass through the wrinkle detection sensor according to the second embodiment, and a lower diagram illustrating a detection state of the wrinkle detection sensor when the wrinkled medium is caused to pass.

FIG. 10 is a side sectional view for describing adjustment of an interval between a first reading unit and a second reading unit of an image reading unit in the scanner according to the first embodiment. The upper diagram in FIG. 11 is a diagram illustrating a state in which a non-wrinkled medium is caused pass through a wrinkle detection sensor according to a second embodiment, and the lower diagram in FIG. 11 is a diagram illustrating a detection state of the wrinkle detection sensor when the non-wrinkled medium is caused to pass. The upper diagram in FIG. 12 is a diagram illustrating a state in which a wrinkled medium is caused to pass through the wrinkled detection sensor according to the second embodiment, and the lower diagram in FIG. 12 is a diagram illustrating a detection state of the wrinkle detection sensor when the wrinkled medium is caused to pass.

Figure 13:
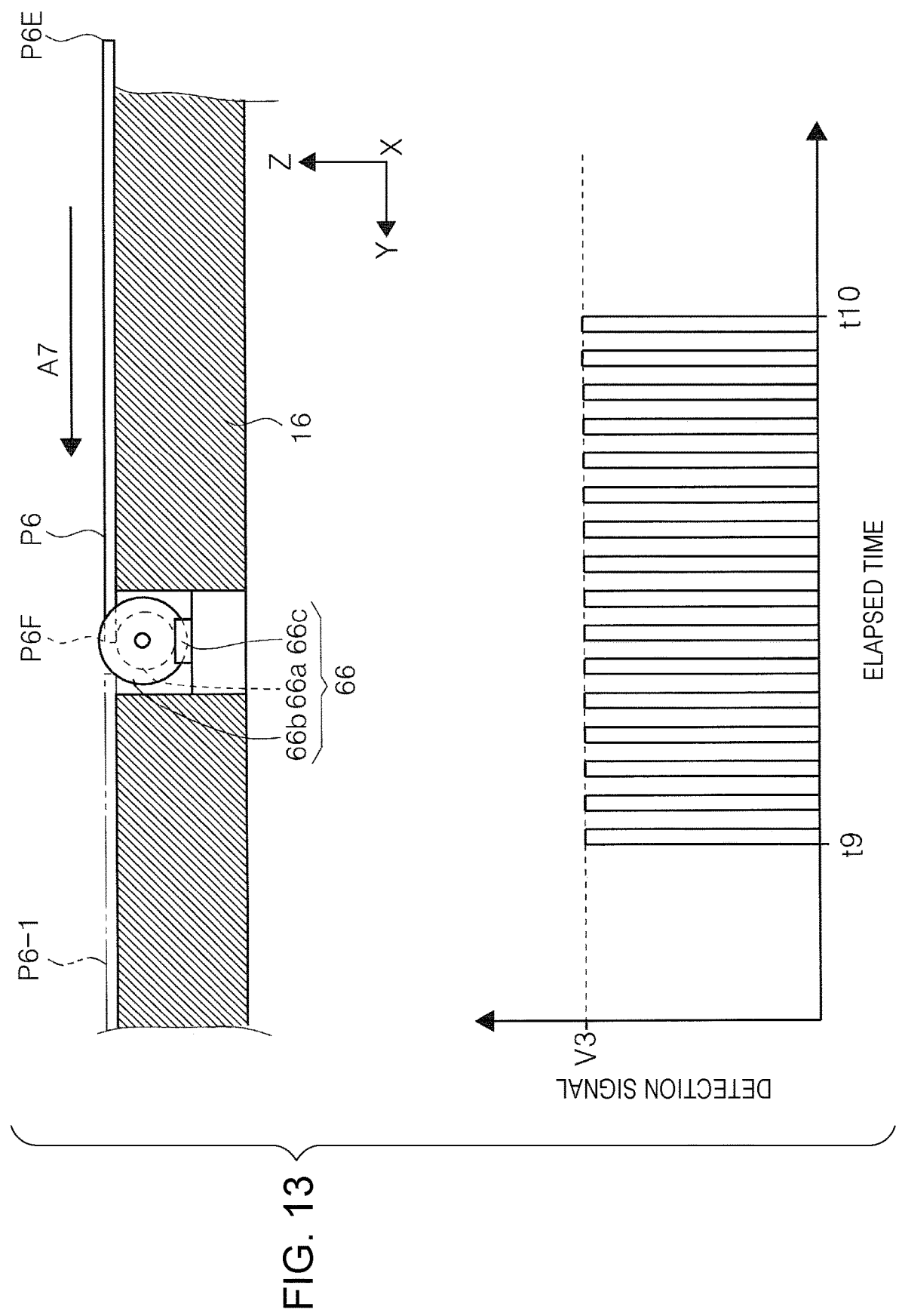
FIG. 13 includes an upper diagram illustrating a state in which a non-wrinkled medium is caused to pass through a wrinkle detection sensor according to a third embodiment, and a lower diagram illustrating a detection state of the wrinkle detection sensor when the non-wrinkled medium is caused to pass.
Figure 14:
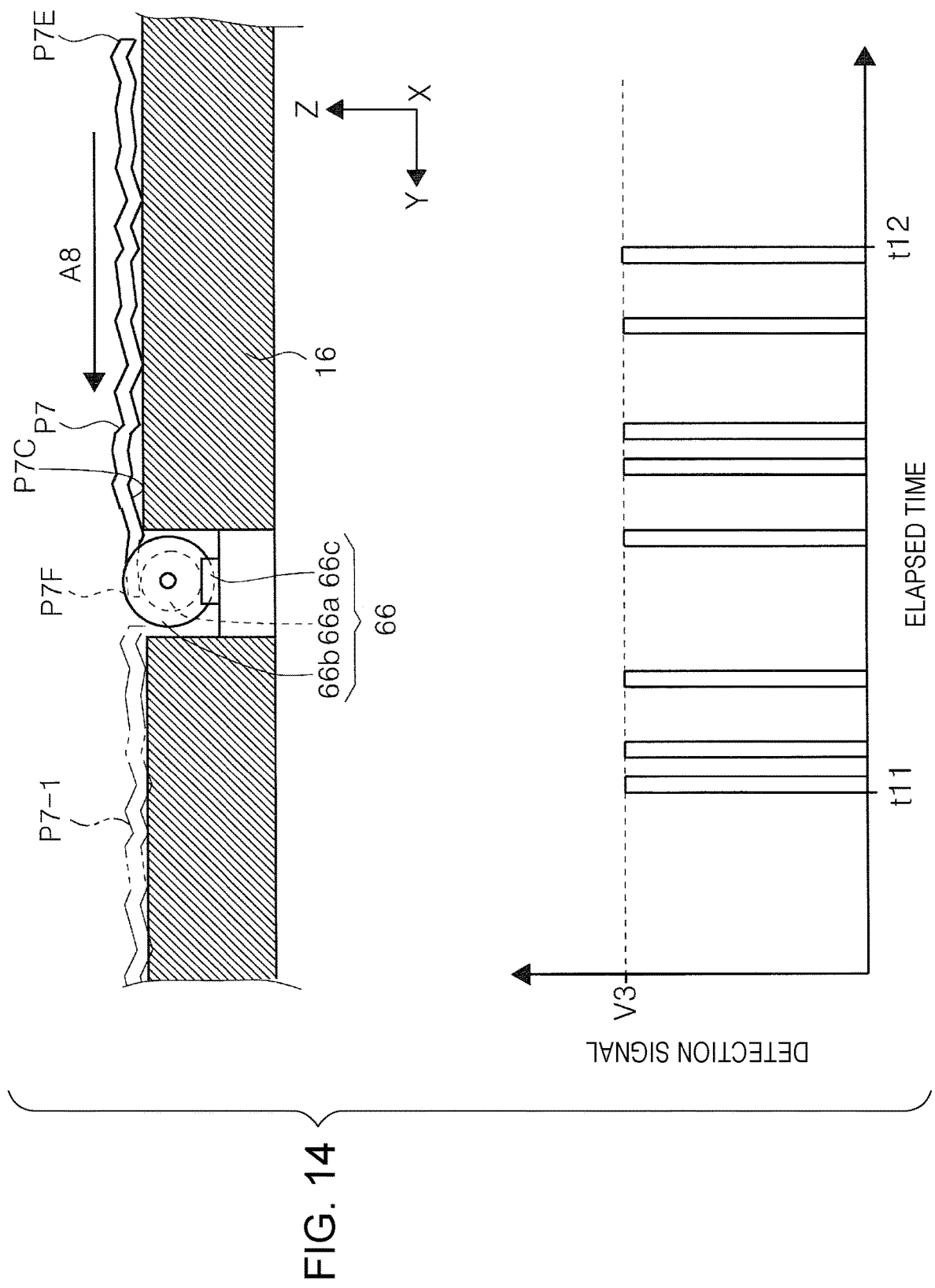
FIG. 14 includes an upper diagram illustrating a state in which a wrinkled medium is caused to pass through the wrinkle detection sensor according to the third embodiment, and a lower diagram illustrating a detection state of the wrinkle detection sensor when the wrinkled medium is caused to pass.

The upper diagram in FIG. 13 is a diagram illustrating a state in which a non-wrinkled medium is caused to pass through a wrinkle detection sensor according to a third embodiment, and the lower diagram in FIG. 13 is a diagram illustrating a detection state of the wrinkle detection sensor when the non-wrinkled medium is caused to pass. The upper diagram in FIG. 14 is a diagram illustrating a state in which a wrinkled medium is caused to pass through the wrinkle detection sensor according to the third embodiment, and the lower diagram in FIG. 14 is a diagram illustrating a detection sensor of the wrinkle detection sensor when the wrinkled medium is caused to pass.

Figure 15:
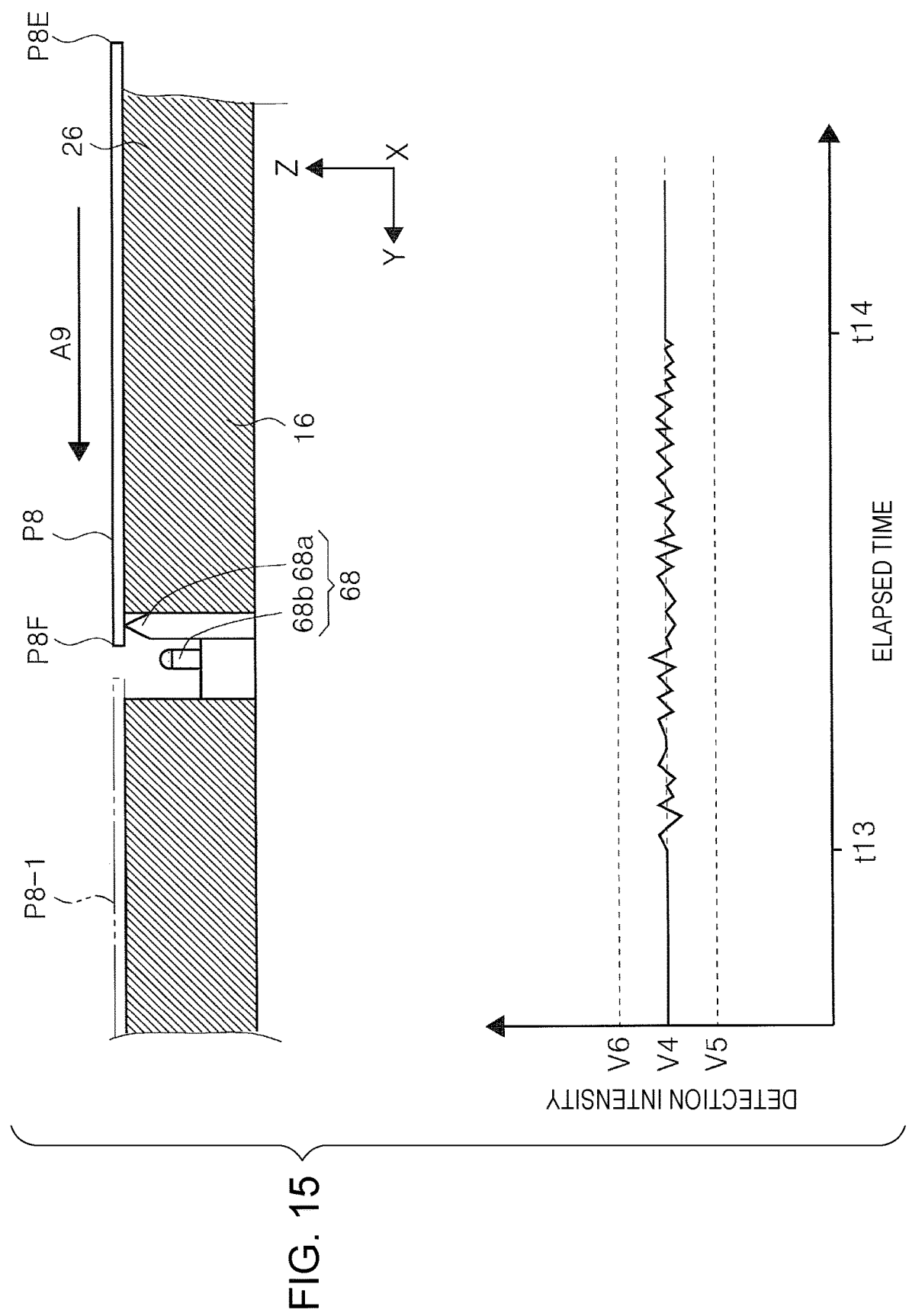
FIG. 15 includes an upper diagram illustrating a state in which a non-wrinkled medium is caused to pass through a wrinkle detection sensor according to a fourth embodiment, and a lower diagram illustrating a detection state of the wrinkle detection sensor when the non-wrinkle medium is caused to pass.
Figure 16:
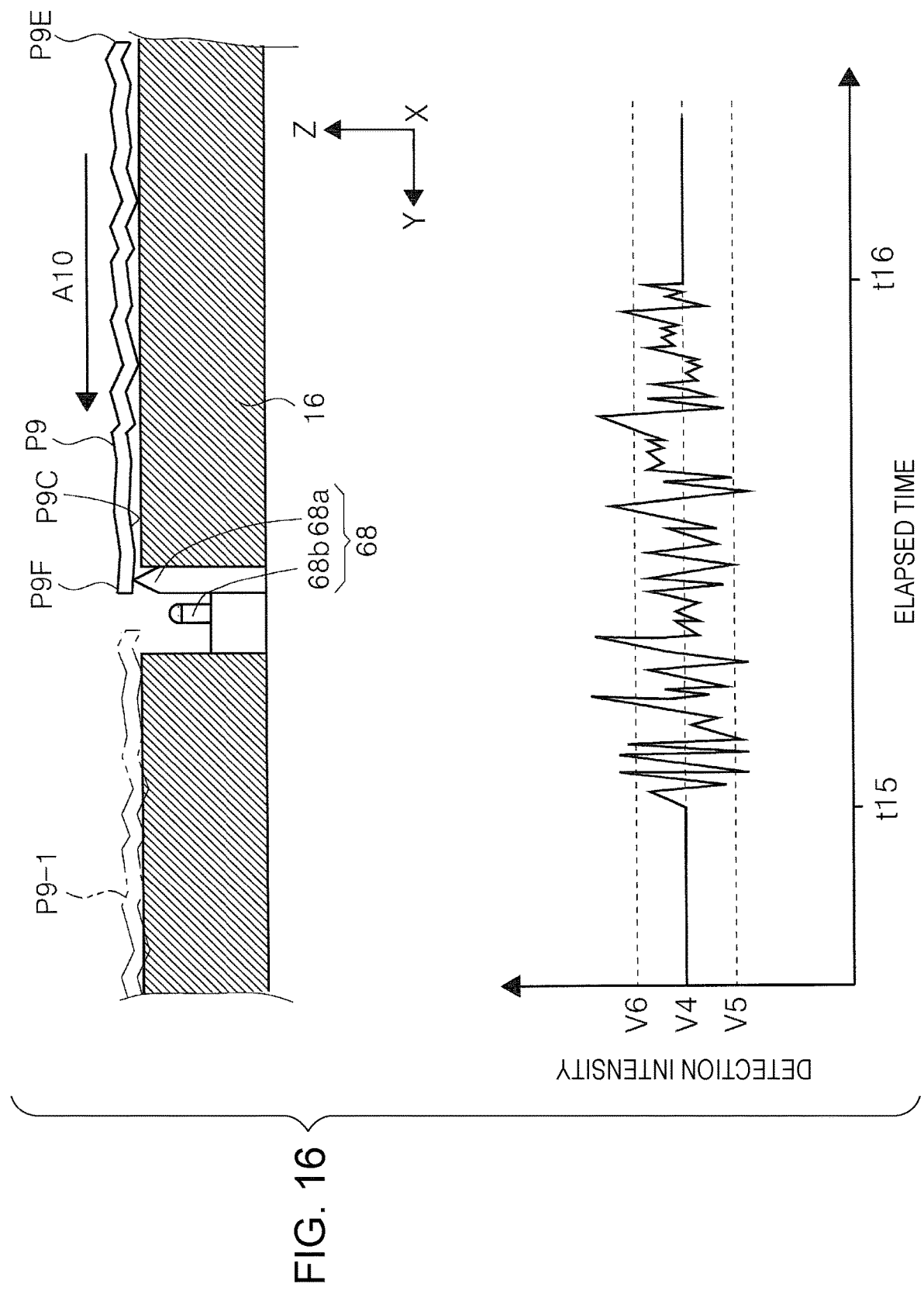
FIG. 16 includes an upper diagram illustrating a state in which a wrinkled medium is caused to pass through the wrinkle detection sensor according to the fourth embodiment, and a lower diagram illustrating a detection state of the wrinkle detection sensor when the wrinkled medium is caused to pass.

The upper diagram in FIG. 15 is a diagram illustrating a state in which a non-wrinkled medium is caused to pass through a wrinkle detection sensor according to a fourth embodiment, and the lower diagram in FIG. 15 is a diagram illustrating a detection state of the wrinkle detection sensor when the non-wrinkled medium is caused to pass. The upper diagram in FIG. 16 is a diagram illustrating a state in which a wrinkled medium is caused to pass through the wrinkle detection sensor according to the fourth embodiment, and the lower diagram in FIG. 16 is a diagram illustrating a detection state of the wrinkle detection sensor when the wrinkled medium is caused to pass. FIG. 17 is a side sectional view illustrating a modification mode of a reading unit of the image reading unit in the respective embodiments.

In the X-Y-Z coordinate systems in the respective diagrams, the X direction corresponds to the width direction of the device and also the width direction of a medium, the Y direction corresponds to the transport direction of the medium, and the Z direction corresponds to the direction that perpendicularly intersects the Y direction and represents the direction that substantially perpendicularly intersects a surface of the medium. Note that the +Y direction side is assumed to be the device front surface side and the −Y direction side is assumed to be the device rear surface side in the respective drawings.

First Embodiment

Outline of Image Reading Apparatus

In FIG. 1, a scanner 10 that is an example of the image reading apparatus will be described. The scanner 10 includes a main body 12 (FIG. 2) and a case body 14 that covers the main body 12 and forms an outer surface of the scanner 10.

A medium setting unit 16 that serves as the "placement unit" for setting a medium (hereinafter, referred to as a "medium P") is provided at an end on the device rear surface side of the main body 12. The medium setting unit 16 can support the medium in an inclined posture. A plurality of media can be set in the medium setting unit. A pair of edge guides 16a that can be displaced in a direction in which the edge guides 16a approach one another or in a direction in which the edge guides 16a are separated from one another are provided in the medium setting unit 16 such that side portions of the medium placed on the medium setting unit are guided.

A user interface unit 18 is provided on the front surface side of the case body 14 of the scanner 10. The user interface unit 18 is formed as a touch panel in an example and serves both as a display unit and as an operation unit. It is possible to execute a medium reading operation and the like of the scanner 10 by operating the user interface unit 18.

A discharge port 20 is provided below the user interface unit 18 on the front surface side of the scanner 10. A medium receiving unit 22 is provided below the discharge port 20. The medium receiving unit 22 can be switched between a state in which the medium receiving unit 22 is accommodated in the main body 12 below the main body (FIG. 2) and a deployed state in which the medium receiving unit 22 is extracted from the main body 12 toward the front surface side (not illustrated).

Concerning Medium Transport Path

In FIG. 2, a medium transport path 26 in the scanner 10 will be described. The medium transport path 26 in the embodiment is formed as a path extending from the medium setting unit 16 to the discharge port 20. In a case in which the upper-lower direction of the sheet surface of FIG. 2 is assumed to be a vertical direction, the medium transport path 26 is formed as a downwardly inclined path that is inclined from the upper side to the lower side in the vertical direction along the Y-axis direction. Note that the thick solid line with the reference numeral P-1 in FIG. 2 represents an example of a track through which the medium P transported through the medium transport path 26 passes.

In the medium transport path 26 in the main body 12, a wrinkle detection sensor 28 that serves as the "wrinkle detection section", which will be described later, feeding rollers 30 and separation rollers 32 that serve as the "feeding section", microphones 34 (FIGS. 3 and 4) that serves as the "sound detection section", which will be described later, a transport roller pair 36 that serves as the "transport section", an image reading unit 38 that serves as the "reading section", and a discharge roller pair 40 are provided from the upstream side (−Y direction side) to the downstream side (+Y direction side) in the transport direction of the medium P. The feeding rollers 30 are driven and rotated by a drive motor 42 (FIG. 3) provided in the main body 12 in one example.

The separation rollers 32 are provided at a position at which the separation rollers 32 face the feeding rollers 30. The separation rollers 32 are provided in a state in which the separation rollers 32 are biased relative to the feeding rollers 30 by a biasing section, which is not illustrated in the drawing. The separation rollers 32 are adapted such that if a plurality of media P enters between the feeding rollers 30 and the separation rollers 32, the separation rollers 32 separate the plurality of media P to send only the medium P at the lowest position to be fed to the downstream side in the transport direction. The medium P supported in the inclined posture by the medium setting unit 16 is nipped by the feeding rollers 30 and the separation rollers 32 and is transported by the transport roller pair 36 arranged on the downstream side in the transport direction. Then, the transport roller pair 36 feeds the medium P, which has been sent from the feeding rollers 30, toward the image reading unit 38.

The image reading unit 38 includes a first reading unit 44A that is provided to face the lower surface, that is, a first surface of the medium P transported along the medium transport path 26 and that serves as the "first reading unit" and a second reading unit 44B that is provided to face the upper surface, that is, a second surface of the medium P transported along the medium transport path 26 and that serves as the "second reading unit". In this example, the first reading unit 44A and the second reading unit 44B are formed as a reading unit and formed as a contact image sensor module (CISM) in one example.

The medium P sent to the image reading unit 38 by the transport roller pair 36 is nipped by the discharge roller pair 40 located on the downstream side of the image reading unit 38 in the transport direction and is discharged from the discharge port 20 to the medium receiving unit 22 after an image on at least either the first surface and the second surface of the medium P is read by the image reading unit 38.

Note that the medium setting unit 16, the feeding rollers 30, the separation rollers 32, the wrinkle detection sensor 28, and the control unit 46, which will be described later, form the medium feeding device 48 in the embodiment.

Concerning Control Unit

The control unit 46 will be described in FIGS. 2 and 3. In the embodiment, the control unit 46 (FIG. 2) is provided in the main body 12. The control unit 46 is formed as an electric circuit provided with a plurality of electronic components in one example. The control unit 46 includes a storage unit 50 that saves data to be used to control the scanner 10 and the like in one example.

As illustrated in FIG. 3, the control unit 46 controls a plurality of drive motors 42 and 43 that serve as power sources. Power of the drive motor 42 is transmitted to the feeding rollers 30 by a power transmission section 52. Power of the drive motor 43 is transmitted to the separation rollers 32, the transport roller pair 36, and the discharge roller pair 40 by a power transmission section 53. Therefore, the control unit 46 controls driving of the feeding rollers 30, the separation rollers 32, the transport roller pair 36, and the discharge roller pair 40 via the drive motors 42 and 43.

The control unit 46 controls reading operations of the first reading unit 44A and the second reading unit 44B in the image reading unit 38. The control unit 46 receives detection signals from detection sections in the microphones (FIGS. 3 and 4), an overlaid feeding detection sensor 54, and a medium passing detection sensor 56. Note that the power transmission sections 52 and 53 (FIG. 3) include a plurality of gears, for example, and are adapted to transmit the power of the drive motors 42 and 43 to targets to be driven, such as the feeding rollers 30, via the plurality of gears.

Note that although the control unit 46 is adapted to control transport and image reading operations of the medium P on the basis of information set via the user interface unit 18, the control unit 46 may control operations necessary to execute the medium reading operation on the basis of information transmitted from the outside (such as a PC).

Concerning Respective Sensors

In FIGS. 4 and 5, arrangement and configurations of the wrinkle detection sensor 28, the microphones 34, the overlaid feeding detection sensor 54, and the medium passing detection sensor 56 will be described. In FIGS. 4 and 5, the wrinkle detection sensor 28, the microphones 34, the overlaid feeding detection sensor 54, and the medium passing detection sensor 56 are arranged in this order from the —Y axis direction (upstream side) to the +Y axis direction (downstream side) in the Y-axis direction (medium transport direction). The microphones 34, the overlaid feeding detection sensor 54, and the medium passing detection sensor 56 will be described first, and then the wrinkle detection sensor 28 will be described.

Referring to FIGS. 4 and 5, the microphones 34 are arranged in a region R in which the feeding rollers 30 are arranged in the medium transport path 26 in the Y-axis direction. The microphones 34 are arranged on the upper side, that is, the +Z direction side of the medium transport path 26 in the embodiment. Referring to FIG. 5, the pair of microphones 34 are arranged with the pair of feeding rollers 30 interposed therebetween in a medium transport region W in the device width direction. The microphones 34 in the embodiment are adapted to be able to detect sound at frequencies in an audible range in one example.

A threshold value B1, which will be described later, is set for a volume of sound detected by the microphones 34 (sound detection level) as illustrated in FIG. 9. In a case in which the volume of the sound detected by the microphones 34 exceeds the threshold value B1 when the medium P is transported, the control unit 46 determines that paper jam has occurred in the medium transport path 26.

The control unit 46 stops the transport of the medium P after determining that paper jam has occurred and displays an alert message such as "The original document being transported may be stuck. Please check it." on the display unit of the user interface unit 18 to prompt the user to perform jam processing.

The overlaid feeding detection sensor 54 for detecting overlaid feeding of the medium P is arranged on the downstream side of the microphones 34 in the transport direction in the medium transport path 26. The overlaid feeding detection sensor 54 is arranged in the medium transport region W in the device width direction as illustrated in FIG. 5. In this example, the overlaid feeding detection sensor 54 is formed as an ultrasonic sensor including a speaker unit 54a and a microphone unit 54b. The overlaid feeding detection sensor 54 is adapted to generate ultrasonic waves from the speaker unit 54a to the medium P passing through the medium transport path 26 and detect sound reflected from the medium P by the microphone unit 54b. Not only overlaid feeding of the medium P but also paper types such as cardboard can be detected based on intensity of the reflected sound by utilizing the overlaid feeding detection sensor 54 in this example.

The medium passing detection sensor 56 is provided on the downstream side of the transport roller pair 36 in the transport direction in the medium transport path 26. The medium passing detection sensor 56 is formed as a contact-type sensor that has a lever in one example. The lever-shaped medium passing detection sensor 56 is arranged on the −Z direction side (lower side) of the medium transport path 26. A tip end of the lever-shaped medium passing detection sensor 56 is formed to project to the inside of the medium transport path 26.

If the medium P is transported along the medium transport path 26, the lever of the medium passing detection sensor 56 is pressed by the tip end of the medium P and is then turned to the downstream side in the transport direction (see the two-dotted chain line part with the reference numeral 56-1 in FIG. 5). In this manner, a detection signal output from the medium passing detection sensor 56 changes, and the control unit 46 can thus recognize the medium P is passing. Note that the medium P is transported to the downstream side in the transport direction in a state in which the medium passing detection sensor 56 is turned to the downstream side in the transport direction.

Concerning Wrinkle Detection Sensor

The wrinkle detection sensor 28 will be described with reference to FIGS. 4 to 7. In the embodiment, the wrinkle detection sensor 28 is provided on the further upstream side (−Y direction side) than a nipping point N1 (FIGS. 4 and 5) between the feeding rollers 30 and the separation rollers 32 in the medium transport path 26, specifically, in the medium setting unit 16 in one example. The wrinkle detection sensor 28 in the embodiment is formed as an optical sensor in one example. The wrinkle detection sensor 28 formed as the optical sensor includes a light emitting unit 28a and a light receiving unit 28b. The wrinkle detection sensor 28 in the embodiment is adapted to irradiate the first surface of the medium P set in the medium setting unit 16 with light from the light emitting unit 28a and receive light reflected from the first surface by the light receiving unit 28b. Therefore, it is possible to form the wrinkle detection sensor 28 with a simple structure at low costs. Note that the "wrinkle" described in the embodiment includes a wrinkle in a medium in a bad state that may cause jam and a wrinkle in a medium in a not very bad state that may not cause jam.

In FIGS. 6 and 7, a wrinkle non-detected state and a wrinkle detection state in the medium P detected by the wrinkle detection sensor 28 will be described. In FIG. 6, a case in which a non-wrinkled medium P2 is transported through the medium transport path 26 will be described. In a case in which the non-wrinkled medium P2 set in the medium setting unit 16 is transported, the wrinkle detection sensor 28 detects a detection value V1 in a state in which the medium P has not been detected by the wrinkle detection sensor 28, that is, in a state in which the light receiving unit 28b has not received light from the light emitting unit 28a colliding against and reflected by the surface of the medium P. Note that the wrinkle detection sensor 28 in the embodiment represents intensity of the light received by the light receiving unit 28b with a size of a value of a current or a voltage to be sent. The current value or the voltage value is the detection value.

In the upper diagram in FIG. 6, a tip end P2F of the medium P2 pass across the upper side of the wrinkle sensor 28 if the medium P2 is sent to the downstream side in the transport direction along the medium transport path 26 (see the arrow A1). In this manner, the light emitted from the light emitting unit 28a collides against and is reflected by the surface of the medium P2 and is then received by the light receiving unit 28b. Note that the arrow L1 of the broken line schematically represents a path of the light emitted from the light emitting unit 28a to the medium P2 while the arrow L2 of the broken line schematically represents a path of the light reflected by the medium P2 and reflected by the light receiving unit 28b in the upper diagram in FIG. 6.

In this manner, detection intensity of the wrinkle detection sensor 28 changes from V1 to V2 as illustrated in the lower diagram in FIG. 6. Note that although the description that the tip end P2F passes through the wrinkle detection sensor 28 with the transport of the medium P2 has been provided with respect to FIG. 6, wrinkle detection in the wrinkle detection sensor 28 starts from a state in which the medium P2 has been detected in a case in which the medium P2 is transported since the medium P2 is set in the medium setting unit 16 provided with the wrinkle detection sensor 28 in practice. Note that the same is true for FIGS. 7 and 11 to 16.

As illustrated in the upper diagram in FIG. 6, if the non-wrinkle medium P2 passes through the wrinkle detection sensor 28 from the tip end P2F to a rear end P2E, light from the light emitting unit 28a is not reflected in a scattered manner and is reflected to the light receiving unit 28b since there is no wrinkle in the surface of the medium P2. In this manner, since light receiving unit 28b can stably receive the reflected light from the tip end P2F to the rear end P2E of the medium P2 when the non-wrinkled medium P2 is transported, the wrinkle detection sensor 28 continuously detects values near the detection value V2 as illustrated in the lower diagram in FIG. 6 (a state in which variations in values are small).

If the rear end P2E of the medium P2 passes through the wrinkle detection sensor 28 as illustrated in the upper diagram in FIG. 6 (the state represented with the reference numeral P2-1 in FIG. 6), the light receiving unit 28b of the wrinkle detection sensor 28 starts not to receive the reflected light from the medium P2, the detection value in the lower diagram in FIG. 6 changes from V2 to V1, and the detection state changes. In this manner, the control unit 46 determines that the rear end P2E of the medium P2 has passed through the wrinkle detection sensor 28.

Note that the time t1 in the lower diagram in FIG. 6 represents a timing at which the wrinkle detection sensor 28 detects the tip end P2F of the medium P2 while the time t2 represents a timing at which the rear end P2E of the medium P2 passes. In the embodiment, the control unit 46 can determine that the medium P2 has passed through the wrinkle detection sensor 28 on the basis of a change in the detection state of the wrinkle detection sensor 28, specifically, a change in the detection intensity from V1 to V2 or a change in the detection intensity from V2 to V1.

In the embodiment, the control unit 46 determines whether or not there is a wrinkle in the medium P to be fed in a preset time (a time during which the medium P is sent by a predetermined amount, for example, several centimeters in the Y-axis direction) immediately after the feeding of the medium P is started in one example. Note that this is an example and it may be determined whether or not there is a wrinkle in a preset time after detection of passing of the tip end P2F of the medium P2 since the control unit 46 can detect that the tip end P2F of the medium P2 has passed on the basis of the change in the detection state of the wrinkle detection sensor 28 as described above, for example.

In a case in which a wrinkled medium P3 (see FIG. 7) is transported from the medium setting unit 16 in the medium transport path 26, the wrinkled medium P3 in the surroundings of the feeding rollers 30 and the separation rollers 32, for example, a part of the medium P3 (a wrinkled part P3C) tends to be caught in each roller or a path forming member of the medium transport path 26 and cause paper jam. Therefore, a time until the tip end P3F of the medium P3 is fed by a predetermined amount while being nipped between the feeding rollers 30 and the separation rollers 32 after the start of the feeding, specifically, a time until the tip end P3F of the medium P3 reaches the transport roller pair 36, for example, may be set as the preset time.

Meanwhile, in a case in which the wrinkled medium P3 is fed as illustrated in the upper diagram in FIG. 7 (see the arrow A2), and when a wrinkled part P3C of the medium P3 is about to pass through the wrinkle detection sensor 28, components that are not reflected to the light receiving unit 28b as represented by the broken line with the reference numeral L4 are generated in the light emitted from the light emitting unit 28a of the wrinkle detection sensor 28 to the wrinkled part P3C (see the arrow of the broken line represented with the reference numeral L3 in FIG. 7). Note that the arrow of the broken line represented with the reference numeral L3 schematically illustrates a path of the light emitted from the light emitting unit 28a to the medium P3 while the arrow represented with the reference numeral L4 schematically illustrates a path of the components of the light that are not reflected by the medium P3 to the light receiving unit 28b, in the upper diagram in FIG. 7.

As a result, if the wrinkled medium P3 is caused to pass through the wrinkle detection sensor 28, light is emitted from the light emitting unit 28a to the wrinkled part, and intensity of the light reflected by the medium P3 decreases. In this manner, the detection value of the wrinkled part becomes a value between V1 and V2 in accordance with the intensity of the light received by the light receiving unit 28b as illustrated in the lower diagram in FIG. 7, specifically, depending on a wrinkle state, and a detection state of the wrinkle detection sensor 28 becomes unstable.

Note that the time t3 represents a timing at which the tip end P3F of the wrinkled medium P3 is detected by the wrinkle detection sensor 28 while the time t4 represents a timing at which the rear end P3E of the wrinkle medium P3 passes through the wrinkle detection sensor 28, in the lower diagram in FIG. 7.

In the embodiment, the control unit 46 determines whether or not a wrinkle in a level that is equal to or greater than a predetermined level has been detected in the medium P3 on the basis of the width of variations in the detection value of the wrinkle detection sensor 28 as illustrated in the lower diagram in FIG. 7. A large width in variations represents a wrinkle in a significant level while a small width in variations represents that there is substantially no wrinkle or that the level of the wrinkle is low. A threshold value for making this determination is stored in the storage unit 50 (FIG. 3). As the threshold value, an optimal value can be experimentally obtained in accordance with the configuration of the device, for example. In a case in which the width of variations in the detection value is greater than the threshold value stored in the storage unit 50, the control unit 46 determines that there is a wrinkle in a level that is equal to or greater than the predetermined level in the medium P3.
Flow of Control in Case in which Wrinkle Detection Sensor Detects Wrinkle in Medium In FIG. 8, a flow of wrinkle detection in the medium P being fed will be described. If a command for reading the medium P is input from the user interface unit 18 or an external input section, the control unit 46 starts to feed the medium P in Step S1.

When the medium P is fed in Step S2, the control unit 46 determines whether or not a wrinkle in a level that is equal to or greater than a predetermined level has been detected in the medium P on the basis of detection information from the wrinkle detection sensor 28. In a case in which no wrinkle in a level that is equal to or greater than the predetermined level has been detected in the medium P being fed, the processing proceeds to Step S3. If the medium P is fed to the image reading unit 38, then the control unit 46 causes the image reading unit 38 to execute an operation of reading the medium P in Step S3.

In contrast, in a case in which some wrinkle in a level that is equal to or greater than the predetermined level has been detected in the medium P being fed in Step S2, the processing proceeds to Step S4. The control unit 46 causes any of predetermined operations 1, 2, and 3, which will be described later, to be executed in Step S4. In a case in which the control unit 46 chooses to cause any of the operations 1 to 3 to be executed, the processing proceeds to Step S3, and the control unit 46 causes the operation of reading the medium P to be executed in Step S3.

In a case in which the control unit 46 chooses to cause the operation 2 to be executed, the control unit 46 causes the feeding of the medium P to stop, interrupts the operation of reading the medium P, and displays an error message such as "A wrinkled original document has been transported. It may be stuck during the transport. Please check it." on the display unit of the user interface unit 18, for example.
Concerning Predetermined Operations Hereinafter, the predetermined operations 1, 2, and 3 will be described. Note that in a case in which the control unit 46 detects any wrinkle in a level that is equal to or greater than the predetermined level in the medium P, the predetermined operations 1 and 3, which will be described later, may be executed alone or both the operations 1 and 3 may be executed in parallel.
Concerning Predetermined Operation 1

First, the predetermined operation 1 will be described with reference to FIG. 9. The predetermined operation 1 is an operation of changing the threshold value B1 of the microphones 34 and degrading sensitivity of jam determination in the embodiment. The threshold value B1 of the microphones 34 is set as a value on the basis of which the control unit 46 determines that jam of the medium P has occurred in a case in which the level of sound detected by the microphones 34 exceeds the threshold value B1 when the medium P is transported along the medium transport path 26.

Specifically, the control unit 46 determines that paper jam of the medium P being fed has occurred in a case in which the volume of the sound detected by the microphones 34 is a volume exceeding the threshold value B1 saved in the storage unit 50 when the medium P is transported along the medium transport path 26. The control unit 46 causes the transport of the medium P to stop, displays an alert message such as "An original document may be stuck during transport. Please check it." on the display unit of the user interface unit 18, for example, and prompts the user to perform jam processing after determining that paper jam has occurred.

Here, in a case in which the wrinkled medium P3 is fed, sound generated when the wrinkled part of the medium P3 is rubbed with the medium setting unit 16 and sound generated when the medium P passes through the feeding rollers 30 and the separation rollers 32 may become larger than the sound in a case in which the non-wrinkled medium P2 is fed. As a result, if the volume o the sound detected by the microphones 34 exceeds the threshold value B1 when the wrinkled medium P3 is fed, it may be erroneously determined that jam has occurred, and the feeding of the medium P3 may be stopped irrespective of the fact that no jam of the medium P3 being fed has occurred.

In the embodiment, the control unit 46 increases the threshold value for determining jam from B1 to B2 (lowers detection sensitivity) as the predetermined operation 1 in a case in which any wrinkle in a level that is equal to or greater than the predetermined level is detected in the medium P on the basis of the detection information from the wrinkle detection sensor 28.

In this manner, the control unit 46 determines that no jam of the medium P being fed has occurred and continues the operation of reading the medium P in a case in which the volume of the sound detected by the microphones 34 is less than the threshold value B2. In a case in which the volume of the sound detected by the microphones 34 is equal to or greater than the threshold value B2, the control unit 46 determines that jam of the medium P being fed has occurred and interrupts the operation of reading the medium P. Note that the control unit 46 may return the threshold value from T2 to T1 after the operation of reading the medium P that has been determined to include any wrinkle in a level that is equal to or greater than the predetermined level is ended or interrupted and the reading operation is then reset.

In this manner, the medium feeding device 48 according to the embodiment includes the microphones 34 that are provided on the further +Y axis direction side than the feeding rollers 30. The control unit 46 determines that jam has occurred in a case in which the volume of sound detected by the microphones 34 when the medium P is fed exceeds the threshold value B1 and increases the threshold value from B1 to B2 in accordance with the detection value output from the wrinkle detection sensor 28, specifically, in accordance with variations between the detection value V1 and the detection value V2.

The wrinkled medium P3 may cause sound to some extent in the medium transport path 26 even if no jam has occurred, and this may lead to erroneous detection that jam has occurred. According to the embodiment, it is possible to more accurately determine jam even in a case in which there is a wrinkle in the medium P since the control unit 46 increases the threshold value for determining jam to B2 in accordance with variations between the detection value V1 and the detection value V2 output from the wrinkle detection sensor 28.

Concerning Predetermined Operation 2

In the embodiment, the predetermined operation 2 is set as an operation of stopping the feeding of the medium P and interrupting the operation of reading the medium P in a case in which any wrinkle has been detected in the medium P being fed by the wrinkle detection sensor 28. That is, the medium reading operation is ended without proceeding the process to Step S3 from Step S4 in FIG. 8.

The control unit 46 stops the feeding rollers 30 in a case in which the detection value output from the wrinkle detection sensor 28 exceeds a predetermined allowable value (in a case in which there is some wrinkle in a level that is equal to or greater than the predetermined level), that is, in accordance with variations in the detection value output from the wrinkle detection sensor 28. The medium P with a wrinkle in a significant level tends to cause jam in the medium transport path 26. With this configuration, it is possible to prevent jam from occurring in advance.

Concerning Predetermined Operation 3

In the embodiment, the predetermined operation 3 is set as an operation of suppressing at least either the feeding speed of the feeding rollers 30 or the transport speed of the transport roller pair 36, that is, an operation of slowing down the speed in a case in which any wrinkle in a level that is equal to or greater than the predetermined level has been detected in the medium P being fed by the wrinkle detection sensor 28. Specifically, the control unit 46 may slow down the feeding speed of the feeding rollers 30 by controlling the drive motor 42, may slow down the transport speed of the transport roller pair 36 by controlling the drive motor 43, or may slow down both the speeds of the feeding rollers 30 and the transport roller pair 36 by controlling the drive motors 42 and 43.

In a case in which there is a wrinkle or a folding line in the medium P, rigidity decreases. In particular, a medium with a wrinkle in a significant level tends to be caught in the medium transport path 26 and tends to cause jam. The control unit 46 suppresses at least either the speed at which the feeding rollers 30 feed the medium P and the speed at which the transport roller pair 36 transports the medium P in accordance with variations in the detection value output from the wrinkle detection sensor 28. With this configuration, it is possible to slowly transport the wrinkled medium in the medium transport path 26, thereby to suppress the medium P from being caught in the medium transport path 26, and to expect suppression of jam.

The above description will be summarized as follows. The medium feeding device 48 includes the medium setting unit 16 on which the medium P is placed, the feeding rollers 30 that feeds the medium P placed on the medium setting unit 16, a wrinkle detection sensor 28 that is provided on a further −Y axis direction side than the feeding rollers 30 and that outputs a detection value in accordance with a wrinkle in the medium P, and in one example, that outputs a detection value (a current value or a voltage value) in accordance with a wrinkle in the medium P, and the control unit 46 that performs predetermined control on the basis of variations in the detection value. With this configuration, it is possible to expect that a wrinkle in the medium P is detected before jam of the medium P occurs, to more reliably detect whether or not there is a wrinkle in the medium P, and thus to perform more appropriate transport control. Concerning Modification Example of First Embodiment Although the control unit 46 is adapted to execute either the predetermined operations 1 or 3 in a case in which any wrinkle in a level that is equal to or greater than the predetermined level has been detected in the medium P being fed in the embodiment, a predetermined operation 4 may be executed. Hereinafter, the predetermined operation 4 will be described.

Although the configuration in which the interval between the first reading unit 44A and the second reading unit 44B that faces the first reading unit 44A with the medium transport path 26 interposed therebetween is fixed in the image reading unit 38 is employed in the embodiment, a configuration in which the interval is variable may be employed. Specifically, the first reading unit 58A may be fixed, and the second reading unit 58B may be adapted to be able to be displaced in a direction in which the second reading unit 58B approaches or is separated from the first reading unit 58A, as illustrated in FIG. 10.

For example, the second reading unit 58B is caused to advance or retreat relative to the medium transport path 26 (see the arrow A4) by rotating a cam member 60 (see the arrow A3), thereby changing the interval between the first reading unit 58A and the second reading unit 58B. Note that the configuration in which the second reading unit 58B is variable is employed in the embodiment, a configuration in which the first reading unit 58A is variable may be employed. Note that the two-dotted chain line part represented with the reference numeral 58B-1 in FIG. 10 represents the second reading unit 58B in a state in which the second reading unit 58B has approached the side of the first reading unit 58A.

In the modification example, the predetermined operation 4 is set as an operation of changing the interval between the first reading unit 58A and the second reading unit 58B by causing the second reading unit 58B to retreat relative to the medium transport path 26 in one example. Specifically, the control unit 46 adjusts the interval between the first reading unit 58A and the second reading unit 58B in accordance with variations in the detection value output from the wrinkle detection sensor 28.

More specifically, a wrinkled medium P tends to cause a shadow when the image reading unit 38 reads the medium P. In such a case, it is possible to increase a contact area with the medium P, to expect reduction of the wrinkle, and thus to obtain a more satisfactory reading result, in accordance with the width of the variations in the detection value output from the wrinkle detection sensor (that is, in accordance with the level of the wrinkle), for example, by the control unit 46 narrowing the interval between the first reading unit 58A and the second reading unit 58B in a case in which the level of the wrinkle in the medium P is significant.

Note that the aforementioned predetermined operations 1, 2, 3, and 4 can also be applied to second to fourth embodiments, which will be described below.

Second Embodiment

In FIGS. 11 and 12, a wrinkle detection sensor 62 according to the second embodiment will be described. The wrinkle detection sensor 62 according to the embodiment is different from the sensor in the first embodiment in that the wrinkle detection sensor 62 is formed as a contact-type sensor. The wrinkle detection sensor 62 in the embodiment includes a contact 62a and a detection unit 62b. Note that the time t5 represents a timing at which a tip end P4F of a medium P4 is detected, the time t6 represents a timing at which a rear end P4E of the medium P4 is detected in the lower diagram in FIG. 11, the time t7 represents a timing at which a tip end P5F of a medium P5 is detected, and the time t8 represents a timing at which a rear end P5E of the medium P5 is detected in the lower diagram in FIG. 12.

In the embodiment, the contact 62a is formed to be able to be displaced (in the Z-axis direction in FIGS. 11 and 12) relative to the detection unit 62b. The contact 62a includes a wheel member 62c rotatably provided at the upper end thereof. The wheel member 62c reduces frictional force caused when the wheel member 62c is brought into contact with the medium P, by rotating in the feeding direction of the medium P.

In the embodiment, the contact 62a is pressurized on the side of the medium transport path 26, that is, the +Z axis direction side by a pressurizing member 64. In this manner, the contact 62a is adapted to be pressed against the surface of the medium P that has been fed and follow the surface of the medium P. In the embodiment, the wrinkle detection sensor 62 is formed as a contact-type sensor, in which detection state changes by the contact 62a following the surface of the medium P and varying in the Z-axis direction relative to the detection unit 62b, which detects whether or not there is a wrinkle in the medium P. Note that the wrinkle detection sensor 62 in the embodiment is adapted to measure the amount of displacement of the contact 62a relative to the detection unit 62b in one example. Therefore, it is possible to form the wrinkle detection sensor 62 with a simple structure at low costs.

If the non-wrinkled medium P4 is fed in the feeding direction (see the arrow A5) in the upper diagram in FIG. 11, the wheel member 62c of the wrinkle detection sensor 62 is brought into contact with the tip end P4F of the medium P4 at the time t5 in the lower diagram in FIG. 11. As a result, the contact 62a is displaced relative to the detection unit 62b in the wrinkle detection sensor 62, and the amount Z1 of displacement of the contact 62a is thus measured.

Here, the amount Z2 of displacement is set as a lower threshold value relative to the amount Z1 of displacement while the amount Z3 of displacement is set as an upper threshold value relative to the amount Z1 of displacement. In the case in which the non-wrinkled medium P4 is fed from the tip end P4F to the rear end P4E relative to the wrinkle detection sensor 62, the amount of displacement in the wrinkle detection sensor 62 from the time t5 to the time t6 is maintained around the amount Z1 of displacement while slightly varying (a state in which the amount of variations in the amount of displacement is small), does not drop below the lower threshold value Z2 and does not exceed the upper threshold value Z3. That is, in a case in which the non-wrinkled medium P4 is fed, the control unit 46 determines that there is no wrinkle in a level that is equal to or greater than the predetermined level in the medium P4 since the amount of displacement in the wrinkle detection sensor 62 does not exceed the range from the lower threshold value Z2 to the upper threshold value Z3.

If the wrinkled medium P5 is fed in the feeding direction (see the arrow A6) as illustrated in FIG. 12, then the wheel member 62c is brought into contact with the tip end P5F of the medium P5 and rotates such that the wheel member 62c follows the surface of the medium P5 with the movement of the medium P5 in the feeding direction. At this time, the contact 62a follows the surface of the medium P5 and varies in the Z-axis direction. When a wrinkled part P5C or the like passes through the wrinkle detection sensor 62, in particular, the contact 62a more greatly varies in the Z-axis direction than in a case in which a non-wrinkled part passes therethrough.

Since the variation greatly changes the amount of displacement detected by the detection unit 62b in the lower diagram in FIG. 12, the amount of displacement detected by the detection unit 62b exceeds the range between the lower threshold value Z2 and the upper threshold value Z3 in some cases. If the control unit 46 determines that the amount of displacement detected by the detection unit 62b has dropped below the lower threshold value Z2 or has exceeded the upper threshold value Z3 from the time t7 to the time t8, the control unit 46 determines that there is some wrinkle in a level that is equal to or greater than the predetermined level in the medium P5 being fed. In a case in which the control unit 46 determines that there is some wrinkle in a level that is equal to or greater than the predetermined level in the medium P5 being fed, the control unit 46 executes any of the predetermined operations 1 to 4.

Third Embodiment

In FIGS. 13 and 14, a wrinkle detection sensor 66 according to the third embodiment will be described. The wrinkle detection sensor 66 in the embodiment is formed as a contact-type sensor. The wrinkle detection sensor 66 in the embodiment includes a roller 66a that serves as the "rotating member", a rotary scale 66b that is provided at one end o the roller 66a in the axial direction (X-axis direction), and an encoder 66c that serves as the "detection unit" for detecting the rotation amount of the rotary scale 66b. Note that the time t9 represents a timing at which a tip end P6F of a medium P6 is detected, the time t10 represents a timing at which a rear end P6E of the medium P6 is detected in the lower diagram in FIG. 13, the time t11 represents a timing at which a tip end P7F of the medium P7 is detected, and the time t12 represents a timing at which a rear end P7E of the medium P7 is detected in the lower diagram in FIG. 14.

In the wrinkle detection sensor 66, the roller 66a is adapted to be brought into contact with a surface of the medium P being fed and rotate with the feeding of the medium P. If the roller 66a rotates, the rotary scale 66b also rotates along with the roller 66a. The encoder 66c is adapted to detect the rotation amount of the rotary scale 66b, that is, the rotation of the roller 66a. Therefore, it is possible to form the wrinkle detection sensor 66 with a simple structure at low costs.

If the non-wrinkled medium P6 is fed in the feeding direction (see the arrow A7) in the upper diagram in FIG. 13, the roller 66a rotates with the feeding of the medium P6. At this time, since the roller 66a rotates in contact with the non-wrinkled medium P6, the rotation of the roller 66a becomes stabilized. As a result, since the rotation of the rotary scale 66b also becomes stabilized, the encoder 66c emits signals at equal intervals with the rotation of the rotary scale 66b as illustrated in the lower diagram in FIG. 13. The control unit 46 determines that there is no any wrinkle in a level that is equal to or greater than the predetermined level in the medium P6 by receiving the signals at the equal intervals from the encoder 66c from the time t9 to the time t10.

Meanwhile, if the wrinkled medium P7 is fed in the feeding direction (see the arrow A8) in the upper diagram in FIG. 14, the roller 66a is brought into contact with the tip end P7F of the medium P7 at the time t11. Thereafter, if a wrinkled part P7C of the medium P7 is about to approach the roller 66a when the medium P7 is fed in the feeding direction, a contact state between the wrinkled part P7C and the roller 66a becomes unstable, and the rotation of the roller 66a also becomes unstable.

As a result, the rotation of the rotary scale 66b also becomes unstable, and detection signals of the amount of rotation of the rotary scale 66b are not generated at the equal intervals by the encoder 66c as illustrated in the lower diagram in FIG. 14. In the embodiment, the control unit 46 determines that there is some wrinkle in a level that is equal to or greater than the predetermined level in the medium P7 in a case in which the detection signals are not generated at the equal intervals by the encoder 66c from the time t11 to the time t12. In a case in which the control unit 46 determines there is some wrinkle in a level that is equal to or greater than the predetermined level in the medium P7 being fed, the control unit 46 executes any of the predetermined operations 1 to 4.

Fourth Embodiment

In FIGS. 15 and 16, a wrinkle detection sensor 68 according to the fourth embodiment will be described. The wrinkle detection sensor 68 includes a contact 68a that is brought into contact with a surface of the medium P and a microphone 68b that serves as the "sound detection section" for detecting sound generated through contact between the medium P and the contact 68a. Therefore, it is possible to form the wrinkle detection sensor 68 with a simple structure at low costs. Note that the time t13 represents a timing at which a tip end P8F of a medium P8 is detected, a time t14 represents a timing at which a rear end P8E of the medium P8 is detected in the lower diagram in FIG. 15, the time t15 represents a timing at which a tip end P9F of a medium P9 is detected, and the time t16 represents a timing at which a rear end P9E of the medium P9 is detected in the lower diagram in FIG. 16.

If the non-wrinkled medium P8 is fed in the feeding direction (see the arrow A9) in the upper diagram in FIG. 15, the contact 68a is brought into contact with a surface of the medium P8 being fed, is rubbed with the surface, and generates rubbing sound. The microphone 68b detects the rubbing sound. In the lower diagram in FIG. 15, the detection value V4 is set to a detection level (volume of sound) of the rubbing sound generated when the contact 68a is brought into contact with the non-wrinkled medium P8. A detection value V5 is set as a lower threshold value relative to the detection value V4 while a detection value V6 is set as an upper threshold value relative to the detection value V4.

If the non-wrinkled medium P8 is fed from the tip end P8F to the rear end P8E relative to the wrinkle detection sensor 68, a detection value of the microphone 68b in the wrinkle detection sensor 68 from the time t13 to the time t14 is maintained near the detection value V4 while slightly varying as illustrated in the lower diagram in FIG. 15 (a state in which the amount of variations in the value is small) does not drop below the lower threshold value V5 and does not exceed the upper threshold value V6. That is, in a case in which the non-wrinkled medium P8 is fed, the control unit 46 determines that there is no wrinkle in a level that is equal to or greater than the predetermined level in the medium P8 since the detection value of the wrinkle detection sensor 68 does not exceed the range between the lower threshold value V5 and the upper threshold value V6 from the time t13 to the time t14.

If the wrinkled medium P9 is fed in the feeding direction (see the arrow A10) as illustrated in the upper diagram in FIG. 16, then the contact 68a is brought into the tip end P9F of the medium P9, is then brought into contact with a surface of the medium P9 with the movement of the medium P9 in the feeding direction, is rubbed, and generates rubbing sound. Here, if a wrinkled part P9C of the medium P9 is about to approach the contact 68a, the rubbing sound becomes larger due to a folding line or the like of the wrinkle being caught in the contact 68a in some case.

Since detection intensity of the rubbing sound (the volume of the sound) of the microphone 68b in the lower diagram in FIG. 16 is greatly changed in this manner, the detection value of the microphone 68b exceeds the range between the lower threshold value V5 and the upper threshold value V6 in some cases. As a result, if the detection intensity of the microphone 68*b* drops below the lower threshold value V5 or exceeds the upper threshold value V6 from the time t15 to the time t16, the control unit 46 determines that there is some wrinkle in a level that is equal to or greater than the predetermined level in the medium P8 being fed. In a case in which the control unit 46 determines that there is some wrinkle in a level that is equal to or greater than the predetermined level in the medium P8 being fed, the control unit 46 executes any of the predetermined operations 1 to 4.

Modification Examples of First to Fourth Embodiments

Configurations of the first reading unit 44A and the second reading unit 44B in the image reading unit 38 may be the configurations as illustrated in FIG. 17. Here, each of the first reading unit 44A and the second reading unit 44B includes one reading sensor and one lamp unit that serves as a light source through the reading sensor and the lamp unit are not illustrated in the drawing. In the embodiment, a configuration in which one reading sensor 70*a* is arranged and lamp units 70*b* and 70*c* are arranged on the upstream side and the downstream side of the reading sensor 70*a* in the Y-axis direction in the reading unit 70 as illustrated in FIG. 17, that is, a configuration in which the two lamp units 70*b* and 70*c* are arranged in the reading unit 70 may be employed.

In the embodiment, the lamp unit 70*b* is arranged on the +Y direction side of the reading sensor 70*a* in the Y-axis direction and is arranged in the reading unit 70 such that the lamp unit 70*b* emits light toward the —Y direction side. Meanwhile, the lamp unit 70*c* is arranged on the —Y direction side of the reading sensor 70*a* in the Y-axis direction and is arranged in the reading unit 70 such that the lamp unit 70*c* emits light toward the +Y direction side.

By arranging the two lamp units 70*b* and 70*c* in this manner, it is possible to suppress generation of a shadow in the read image due to a wrinkle or a folding line when a wrinkled part of the medium P is read by the reading sensor 70*a* in a case in which there is some wrinkle in the medium P and to thereby suppress degradation of quality in reading the medium P.

Note that the invention is not limited to the above examples, and it is needless to say that various modifications can be made within the scope of the invention described in the claims and that those modifications are also encompassed within the scope of the invention.

Although the case in which the medium feeding device according to the invention is applied to the scanner that is an example of the image reading apparatus has been described in the aforementioned respective embodiments, in particular, it is also possible to apply the medium feeding device to a recording device provided with a recording head for performing recording on a medium, such as a printer.

The entire disclosure of Japanese Patent Application No. 2018-025184 filed Feb. 15, 2018 is expressly incorporated by reference herein.

What is claimed is:

1. A medium feeding device comprising:
   a placement unit on which a medium is placed;
   a feeding section that feeds the medium placed on the placement unit;
   a wrinkle detection section that is embedded in the placement unit, faces a rear side of the medium that is in contact with the placement unit, and outputs a detection value in accordance with a wrinkle in the medium; and
   a control section that performs predetermined control on the basis of the detection value of the wrinkle detection section.

2. The medium feeding device according to claim 1, further comprising:
   a first sound detection section that is provided on a further downstream side than the feeding section in the feeding direction and detects sound; and
   a storage unit that stores information regarding the device,
   wherein the control section determines that jam has occurred in a case in which a sound volume detected by the first sound detection section when the medium is fed exceeds a threshold value stored in the storage unit, and
   wherein the control section increases the threshold value in accordance with the detection value output from the wrinkle detection section.

3. The medium feeding device according to claim 1,
   wherein the wrinkle detection section is formed of an optical sensor that includes a light emitting unit that emits light to a surface of the medium placed on the placement unit and a light receiving unit that receives light reflected by the surface of the medium.

4. The medium feeding device according to claim 1,
   wherein the wrinkle detection section is formed of a contact-type sensor that includes a contact that is brought into contact with a surface of the medium placed on the placement unit and a detection unit that detects motion of the contact.

5. The medium feeding device according to claim 1,
   wherein the wrinkle detection section is formed of a contact-type sensor that includes a rotating member that rotates in contact with a surface of the medium placed on the placement unit and a detection unit that detects motion of the rotating member.

6. The medium feeding device according to claim 1,
   wherein the wrinkle detection section includes a contact that is brought into contact with a surface of the medium placed on the placement unit, and
   wherein the wrinkle detection section is formed of a second sound detection section that detects sound generated through contact between the medium and the contact.

7. The medium feeding device according to claim 1, further comprising:
   a storage unit that stores information regarding the device,
   wherein the control section stops the feeding section in a case in which the detection value output from the wrinkle detection section exceeds a predetermined threshold value.

8. An image reading apparatus comprising:
   a reading section that reads a medium;
   a transport section that transports the medium to the reading section; and
   the medium feeding device according to claim 1 that feeds the medium to the transport section.

9. The image reading apparatus according to claim 8,
   wherein the control section changes at least either a medium feeding speed of the feeding section or a medium transport speed of the transport section in accordance with the detection value output from the wrinkle detection section.

10. An image reading apparatus, comprising:
a reading section that reads a medium; and
a medium feeding device, the medium feeding device comprising:
- a placement unit on which a medium is placed;
- a feeding section that feeds the medium placed on the placement unit;
- a wrinkle detection section that is provided on a further upstream side than the feeding section in a feeding direction and outputs a detection value in accordance with a wrinkle in the medium; and
- a control section that performs predetermined control on the basis of the detection value of the wrinkle detection section, wherein the reading section includes a first reading unit and a second reading unit that are arranged to face each other with a medium transport path interposed therebetween, and the reading section is able to adjust an interval between the first reading unit and the second reading unit, and wherein the control section adjusts an interval between the first reading unit and the second reading unit in accordance with the detection value output from the wrinkle detection section.

\* \* \* \* \*